(12) United States Patent
Nagayasu

(10) Patent No.: US 9,561,741 B2
(45) Date of Patent: Feb. 7, 2017

(54) VEHICLE SEAT

(71) Applicant: TOYOTA BOSHOKU KABUSHIKI KAISHA, Aichi-ken (JP)

(72) Inventor: Hidetaka Nagayasu, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 244 days.

(21) Appl. No.: 14/172,097

(22) Filed: Feb. 4, 2014

(65) Prior Publication Data

US 2014/0225407 A1 Aug. 14, 2014

(30) Foreign Application Priority Data

Feb. 8, 2013 (JP) ................................. 2013-023035

(51) Int. Cl.
*B60N 2/42* (2006.01)
*B60N 2/14* (2006.01)
(Continued)

(52) U.S. Cl.
CPC .................. *B60N 2/14* (2013.01); *B60N 2/449* (2013.01); *B60N 2/5825* (2013.01); *B60N 2/646* (2013.01);
(Continued)

(58) Field of Classification Search
USPC ........................................................ 297/314
See application file for complete search history.

(56) References Cited

U.S. PATENT DOCUMENTS 2,799,323 A * 7/1957 Berg ...................... A47C 3/025
297/284.1
5,490,718 A * 2/1996 Akizuki ................. B60N 2/507
297/452.18
(Continued)

FOREIGN PATENT DOCUMENTS

CN 1678219 10/2005
CN 201941625 8/2011
(Continued)

OTHER PUBLICATIONS

Office Action issued in China Counterpart Patent Appl. No. 201410045509.8, dated Oct. 9, 2015, along with an English translation thereof.
(Continued)

*Primary Examiner* — David E Allred
(74) *Attorney, Agent, or Firm* — Greenblum & Bernstein, P.L.C.

(57) ABSTRACT

There is provided a vehicle seat including a seat frame which supports a load of a sitting passenger, a seat pad which is set on the seat frame and receives the load of the sitting passenger to be relieved, and a support body which is supported to the seat frame and supports a part of the seat pad from a backside thereof. The support body is supported to the seat frame to be slidable in an in-plane direction of a plane supporting the load of the sitting passenger or to be axially rotatable in an out-of-plane direction of the plane, such that the load of the sitting passenger can be relieved. The seat pad includes a fixed part which is supported to the seat frame at a fixed position and a movable part which is supported to the support body to be movable.

5 Claims, 23 Drawing Sheets

(51) Int. Cl.
*B60N 2/64* (2006.01)
*B60N 2/70* (2006.01)
*B60N 2/58* (2006.01)
*B60N 2/72* (2006.01)
*B60N 2/44* (2006.01)
*B60N 2/02* (2006.01)

(52) U.S. Cl.
CPC ........... *B60N 2/7047* (2013.01); *B60N 2/7094* (2013.01); *B60N 2/72* (2013.01); *B60N 2002/022* (2013.01); *B60N 2002/0208* (2013.01); *B60N 2002/0212* (2013.01); *B60N 2002/0216* (2013.01); *B60N 2205/30* (2013.01)

(56) References Cited

U.S. PATENT DOCUMENTS

| | | | |
|---|---|---|---|
| 5,976,097 A | | 11/1999 | Jensen |
| 7,690,974 B2* | | 4/2010 | Johnson .................. A01D 75/00 |
| | | | 280/507 |
| 2004/0189078 A1* | | 9/2004 | Andersson ............. B60N 2/502 |
| | | | 297/452.49 |
| 2004/0256905 A1* | | 12/2004 | Fujita ................... B60N 2/7094 |
| | | | 297/452.49 |
| 2006/0055225 A1 | | 3/2006 | Yasuda et al. |
| 2007/0152483 A1* | | 7/2007 | Fujita ........................ A47C 7/28 |
| | | | 297/284.1 |
| 2009/0051206 A1* | | 2/2009 | Fujita ................... B60N 2/7094 |
| | | | 297/452.49 |
| 2012/0068510 A1 | | 3/2012 | Chen |
| 2015/0343924 A1* | | 12/2015 | Takeuchi ................. B60N 2/39 |
| | | | 297/314 |

FOREIGN PATENT DOCUMENTS

| | | |
|---|---|---|
| CN | 202053923 | 11/2011 |
| CN | 102551387 | 7/2012 |
| CN | 102717727 | 10/2012 |
| EP | 000401092 | * 12/1990 |
| EP | 000548924 | * 6/1993 |
| JP | 2000-318498 | 11/2000 |
| JP | 2003-169725 | 6/2003 |
| JP | 4095583 | 12/2005 |
| JP | 2006-111192 | 4/2006 |
| JP | 2006-175144 | 7/2006 |
| WO | 2006/089333 | 8/2006 |

OTHER PUBLICATIONS

JP Office Action in JP Appl. No. 2013-023035, May 31, 2016 with English language translation.

* cited by examiner

VEHICLE SEAT

BACKGROUND OF THE INVENTION

1. Field of the Invention

The present invention relates to a vehicle seat. More specifically, the present invention relates to a vehicle seat including a seat frame which supports a load of a sitting passenger, and a seat pad which is set on the seat frame to receive the load of the sitting passenger to be relieved.

2. Description of the Related Art

It has been known that when a passenger sits on a vehicle seat with a same posture for a long time, a blood flow is slowed, so that the passenger tends to feel fatigue. In order to solve this problem, JP-B-4095583 discloses a vehicle seat in which a seat cushion is supported to a base on a floor to be swingable from side to side such that a passenger can change a posture when sitting on the seat. Specifically, the seat cushion is supported to the base to be swingable from side to side through a plurality of sphere bodies or rollers. Thus, the passenger can swing the seat cushion from side to side while rolling the sphere bodies or the rollers when sitting on the seat.

However, in the above-described vehicle seat, since the entire seat cushion is configured to swing relative to the base, it is difficult for the passenger to stabilize a sitting posture, so that a sitting quality is not good.

SUMMARY OF THE INVENTION

The present invention has been made in view of the above circumstances, and an aspect of the present invention provides a vehicle seat which, while maintaining a stable sitting quality, allows a passenger to easily change a sitting posture during driving or stopping a vehicle and which can be moved to appropriately relieve a body pressure according to the change of the sitting posture.

According to an illustrative embodiment of the present invention, there is provided a vehicle seat comprising: a seat frame which supports a load of a sitting passenger; a seat pad which is set on the seat frame and receives the load of the sitting passenger to be relieved; and a support body which is supported to the seat frame and supports a part of the seat pad from a backside thereof, wherein the support body is supported to the seat frame to be slidable in an in-plane direction of a plane supporting the load of the sitting passenger or to be axially rotatable in an out-of-plane direction of the plane, such that the load of the sitting passenger can be relieved, and wherein the seat pad includes a fixed part which is supported to the seat frame at a fixed position and a movable part which is supported to the support body to be movable.

According to the above configuration, while the load of the sitting passenger is stably received at a fixed position on the fixed part of the seat pad through the support of the seat frame, the load accompanied by the posture change of the sitting passenger is received to be relieved on the movable part of the seat pad through the support of the support body. Therefore, it is possible to maintain the stable sitting quality at the fixed part of the seat pad and to appropriately relieve the body pressure at the movable part of the seat pad in conformity with the passenger movement of changing the posture.

In the above vehicle seat, the support body may be configured such that a center portion of the support body in a width direction is rotatably axis-supported to the seat frame and left and right surface parts are tilted to follow a movement of the load of the sitting passenger, which is applied unevenly between left and right.

According to the above configuration, at a state where the sitting passenger applies the load to the seat pad at a usual sitting posture, the support body is kept at a balanced posture state where the left and right heights are same with the load being evenly applied at left and right sides. Hence, the usual sitting posture of the sitting passenger is more stabilized. Also, when the sitting passenger again adjusts the posture by raising one hip part or back to thus unevenly apply the load to any one of the left and right sides, the uneven load is applied to a surface part of a side which is a support point of the posture change, so that the support body is tilted. Thereby, the passenger can easily change the sitting posture while maintaining the more stable sitting quality, and the body pressure can be appropriately relieved in conformity with the passenger movement.

In the above vehicle seat, one end of the center portion of the support body may be rotatably axis-supported to the seat frame, and the other end thereof may be elastically hung to the seat frame by a plurality of springs, such that the support body is supported in a tilt direction.

According to the above configuration, the support body is restrained from being moved in the seat width direction in the vicinity of one end axis-supported to the seat frame and can be moved in the seat width direction against the elastic force in the vicinity of the other end elastically hung to the seat frame. Hence, according to this configuration, it is possible to configure the support body such that it can appropriately support a part, at which it is desired to strongly restrain the lateral movement of the body, such as the femoral regions of the sitting passenger, and a part, at which it is desired to flexibly permit the lateral movement of the body, such as the hip part, respectively. Therefore, it is possible to further improve the sitting quality at the usual sitting posture.

In the above vehicle seat, the support body may be provided within a range of a frame-shaped cushion frame configuring a skeleton of a seat cushion, and a front end of the center portion of the support body may be rotatably axis-supported to the cushion frame, and a rear end thereof may be elastically hung to the cushion frame by the plurality of springs, such that the support body is supported in the tilt direction.

According to the above configuration, the lateral movement of the femoral regions of the passenger sitting on the seat cushion is strongly restrained by a support structure of the front end of the support body, and the lateral movement of the hip part of the sitting passenger is flexibly permitted to a certain extent by a support structure of the rear end of the support body. Therefore, when this configuration is particularly applied to a driver seat on which the passenger steps on an accelerator pedal, the lateral movement of the femoral regions is restrained to more stabilize the driving posture and the lateral movement of the hip part is flexibly permitted to a certain extent to make the sitting quality more comfortable.

In the above vehicle seat, the seat pad may be formed with a slit at a boundary part of the movable part and the fixed part to allow the movable part to follow the movement of the support body.

According to the above configuration, since the fixed part and the movable part of the seat pad are difficult to follow the mutual movement, it is possible to stabilize the fixed part at the fixed position more easily and to enable the movable part to follow the movement of the support body more easily. Hence, while maintaining the more stable sitting quality, it is possible to appropriately relieve the body pressure in conformity with the passenger movement of changing the posture.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, illustrative embodiments of the present invention will be described with reference to the drawings.

First Illustrative Embodiment

Figure 1:
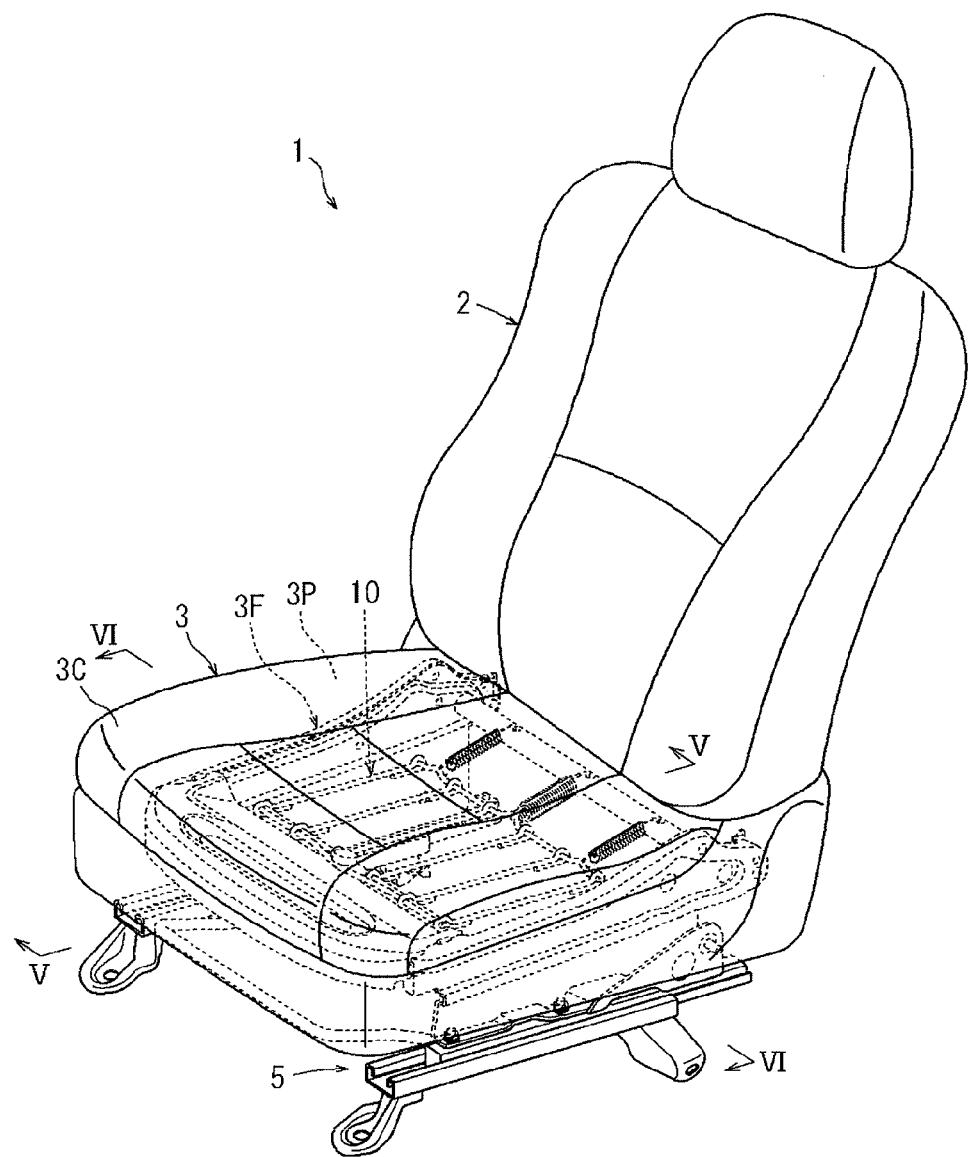
FIG. 1 is a perspective view showing a schematic configuration of a vehicle seat according to a first illustrative embodiment.
Figure 2:
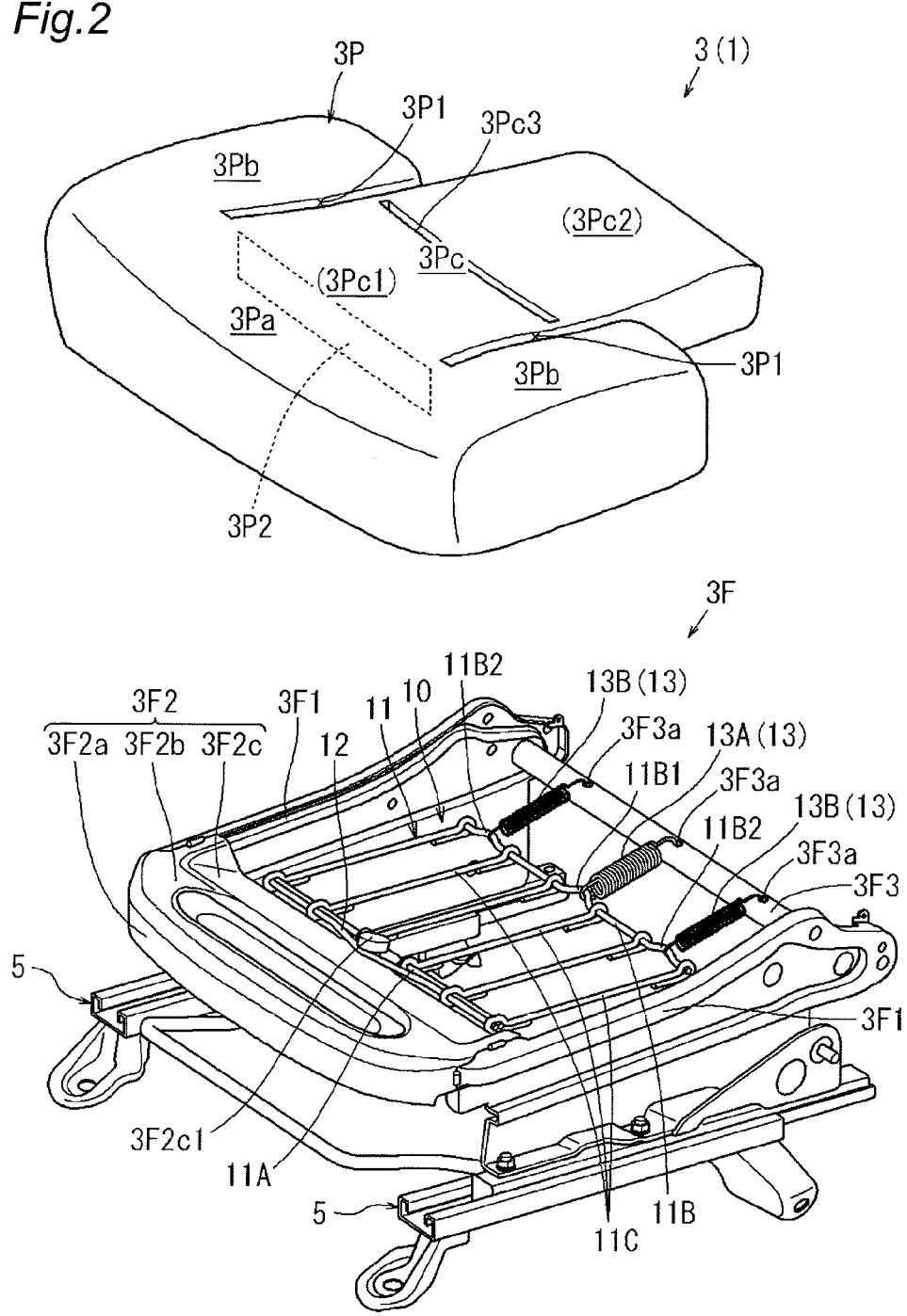
FIG. 2 is an exploded perspective view of a seat cushion.

First, a configuration of a seat 1 according to a first illustrative embodiment is described with reference to FIGS. 1 to 8. As shown in FIG. 1, the seat 1 is configured as a driver seat of an automobile and includes a seat back 2 which is a back support part of a sitting passenger, and a seat cushion 3 which is a sitting part. As shown in FIG. 2, the seat cushion 3 is provided to a vehicle floor via a pair of left and right slide rails 5, and a seat position in a seat front-rear direction relative to the floor can be adjusted by the slide rails 5.

As shown in FIG. 1, the seat back 2 is connected to a rear end portion of the seat cushion 3 via recliners (not shown), and a standing angle (a back support angle) thereof relative to the seat cushion 3 can be adjusted in the seat front-rear direction by operations of the recliners. In the meantime, since the configurations of the respective slide rails 5 and the recliners are similar to those disclosed in JP-A-2010-221935 or the like, the descriptions of the specific configurations are omitted.

Figure 3:
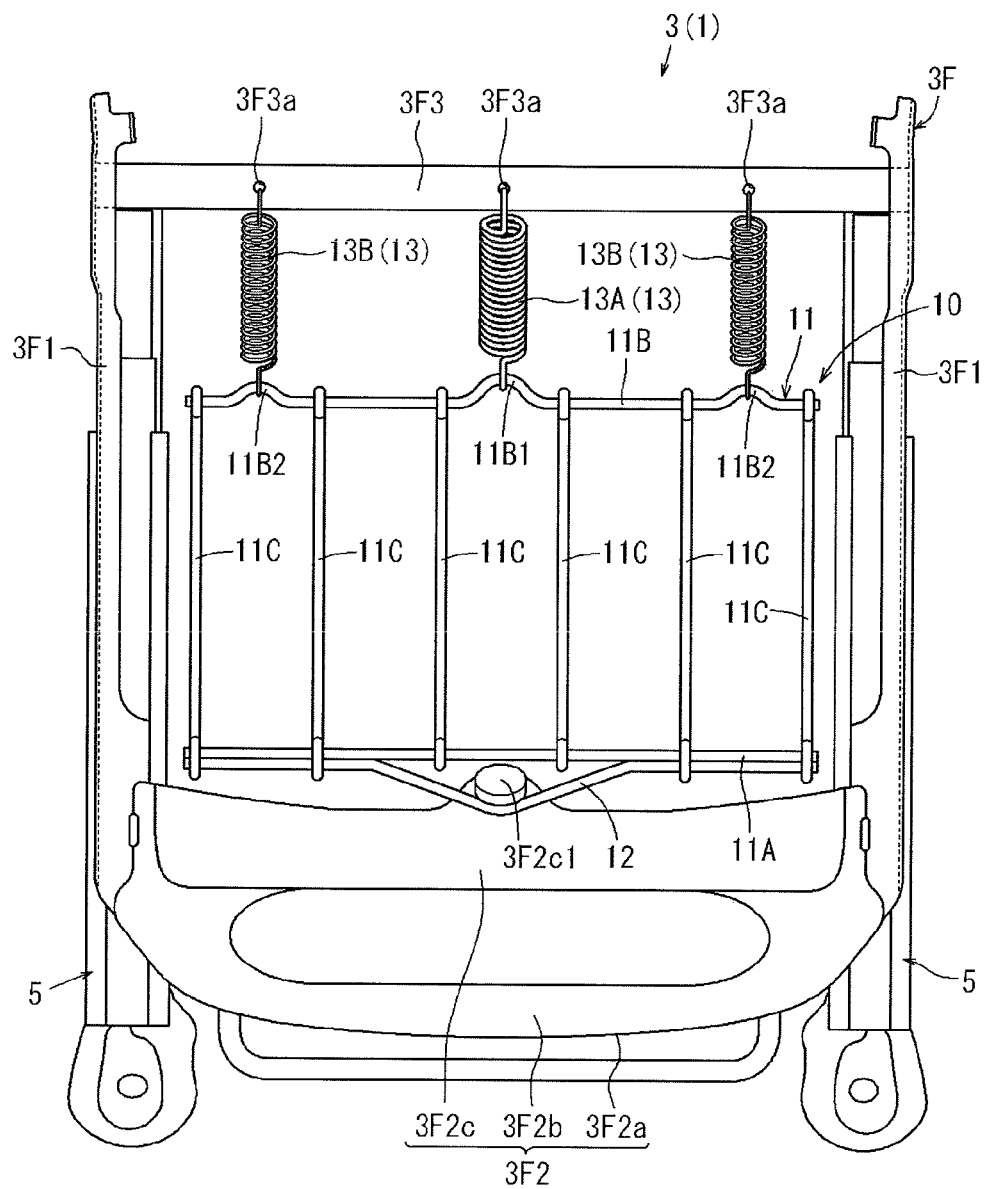
FIG. 3 is a plan view of a cushion frame.

As shown in FIGS. 2 and 3, the seat cushion 3 includes a frame-shaped cushion frame 3F (an example of a seat frame) forming an internal skeleton thereof, a support body 10 which is provided within a range of the cushion frame 3F, a cushion pad 3P (an example of a seat pad) which is supported to the cushion frame 3F and the support body 10 from a lower side (a backside) and gently receives a load of a sitting passenger, and a cushion cover 3C (refer to FIG. 1) which is made of fabric and covers an entire surface of the cushion pad 3P.

The cushion frame 3F has a quadrangle shape conforming to a periphery shape of the seat cushion 3. Specifically, the cushion frame 3F includes a pair of left and right side frames 3F1 made of a steel plate long in the seat front-rear direction, a front panel 3F2 made of a steel plate which is integrally bridged between front end portions of the side frames 3F1, and a rear pipe 3F3 made of a round steel pipe which is integrally bridged between rear parts of the side frames 3F1.

As shown in FIG. 2, each side frame 3F1 has such a shape that an upper edge part and an intermediate part thereof are bent towards an inside of the seat such that structural strength against the bending or torsion is improved, and a lower edge part thereof is integrally connected to an upper part of an upper rail of each slide rail 5. The front panel 3F2 is strongly integrally connected to upper face parts and front face parts of the respective side frames 3F1 by spot welding with being brought into contact with the same so as to connect the front end portions of the respective side frames 3F1 each other. Here, the front panel 3F2 includes a front plate part 3F2*a* facing the front of the seat, a top plate part 3F2*b* facing the upper of the seat, and an inclined part 3F2*c* which obliquely extends from a rear edge part of the top plate part 3F2*b* in a rear-lower direction of the seat.

The front plate part 3F2*a* includes left and right edge parts which are respectively bent in the seat rear direction so as to follow the periphery shape of the front side face of the seat cushion 3, and respective edge portions of the bent ends are strongly integrally connected to the front face parts of the respective side frames 3F1 by the spot welding with being brought into contact with the same. The top plate part 3F2b includes left and right edge parts which are strongly integrally connected at front and rear portions thereof to the upper face parts of the respective side frames 3F1 by the spot welding with being placed on the upper face parts of the respective side frames 3F1. The inclined part 3F2c is positioned between the side frames 3F1 and is provided to form an inclined surface straightly extending from the rear edge part of the top plate part 3F2b in the rear-lower direction of the seat.

Figure 5:
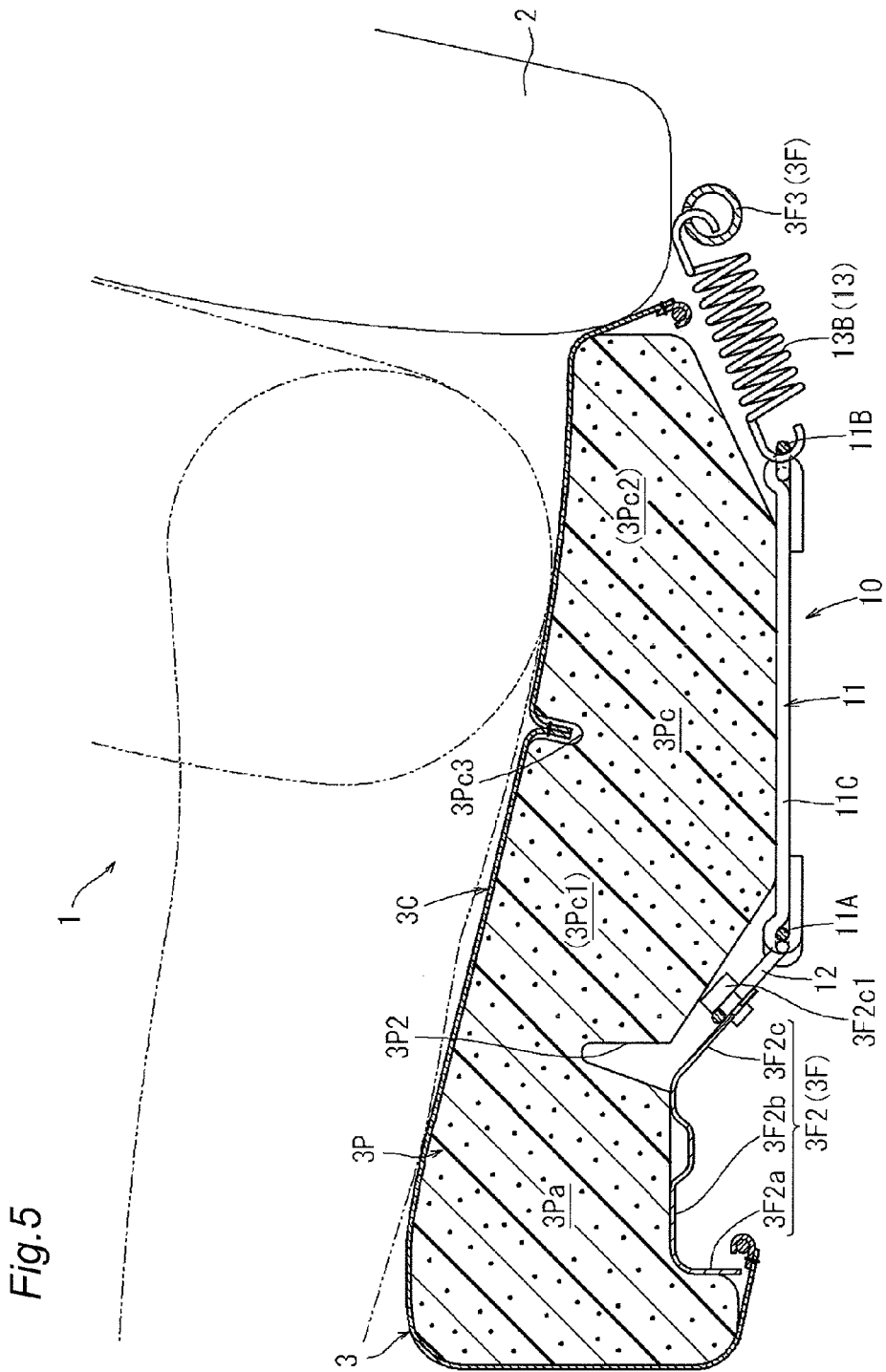
FIG. 5 is a sectional view taken along a line V-V of FIG. 1.

As shown in FIG. 5, the front plate part 3F2a of the front panel 3F2, which faces the front of the seat, forms a front face skeleton of the seat cushion 3. Also, the top plate part 3F2b of the front panel 3F2, which faces the upper side of the seat, forms an upper face skeleton of a front end portion region of the seat cushion 3 supporting a vicinity of front ends of the femoral regions of the sitting passenger. Also, the inclined part 3F2c of the front panel 3F2, which extends from the rear edge part of the top plate part 3F2b in the rear-lower direction of the seat, forms an upper face skeleton of the intermediate part which supports the femoral regions of the sitting passenger while raising a front side thereof. Also, as shown in FIG. 2, the inclined part 3F2c is attached at a center portion thereof in the seat width direction with a step pin 3F2c1 to which a hanging wire 12 is hung to be axially-rotatable. The hanging wire 12 is provided on a front wire 11A of the support body 10 (described later).

The support body 10 includes a contour mat 11, which is formed into a ladder shape by a plurality of steel rods, the hanging wire 12 for hanging the front wire 11A of the contour mat 11 to the step pin 3F2c1 attached to the inclined part 3F2c of the front panel 3F2, and a plurality of (three) springs 13 for elastically suspending and connecting a rear wire 11B of the contour mat 11 to the rear pipe 3F3. The contour mat 11 is formed into the ladder shape by the one front wire 11A which extends in the seat width direction, the one rear wire 11B which extends in the seat width direction, and a plurality of (six) bridge wires 11C which are arranged in the seat width direction and are bridged between the front wire 11A and the rear wire 11B.

Figure 4:
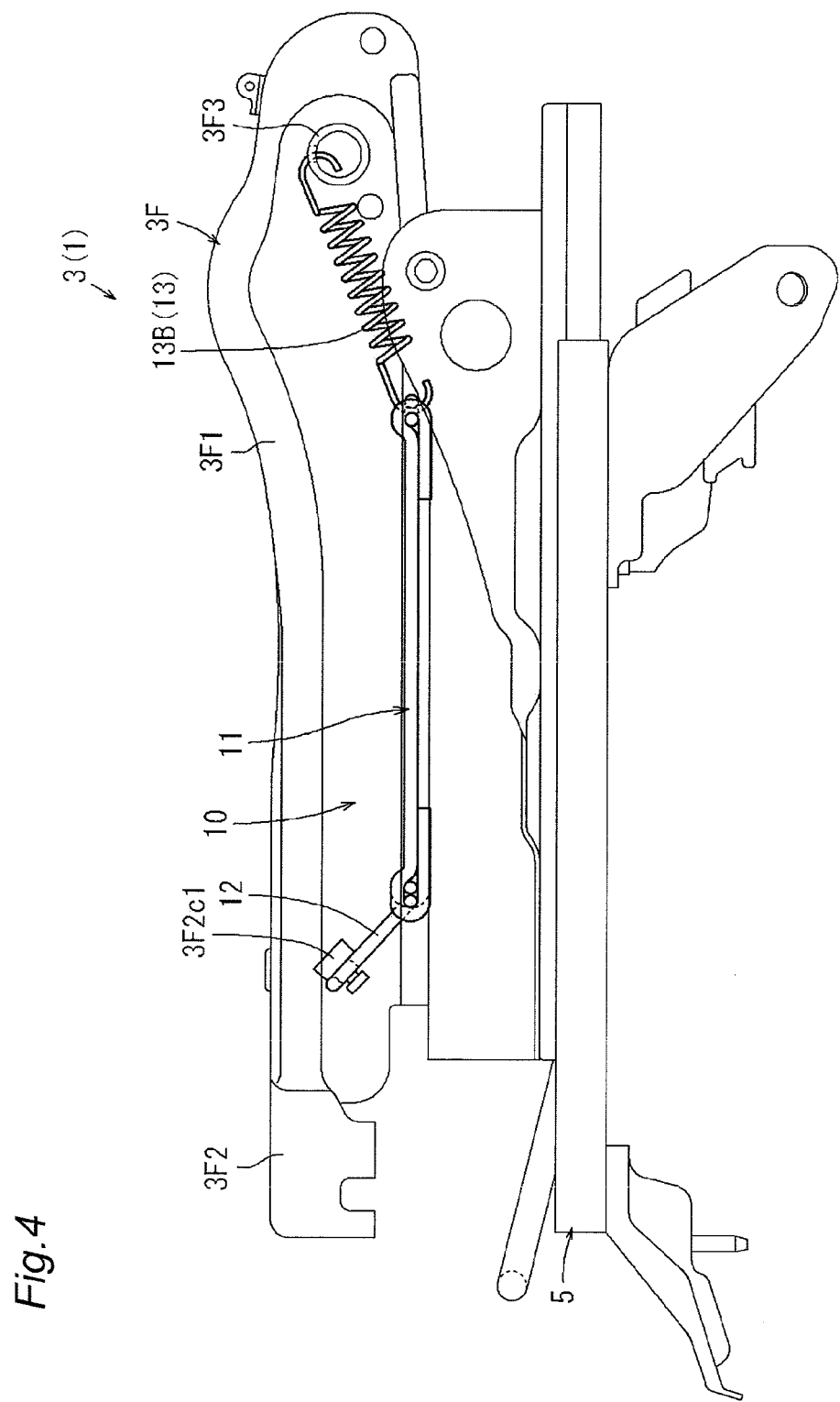
FIG. 4 is a side view of the cushion frame where a support body is shown with being emphasized.

As shown in FIGS. 3 and 4, the front wire 11A is arranged at a front position which is a just rear-lower position of the inclined part 3F2c of the front panel 3F2 within the range of the cushion frame 3F. Also, the rear wire 11B is arranged at a rear position which is a just front position of the rear pipe 3F3 within the range of the cushion frame 3F. Also, the bridge wires 11C which are bridged between the front and rear wires in the front-rear direction are arranged side by side at an equal interval in the seat width direction between the front wire 11A and the rear wire 11B.

As shown in FIG. 3, each of the front wire 11A and the rear wire 11B includes end portions which extend to end positions in the seat width direction, which are just inner sides of the respective side frames 3F1 of the cushion frame 3F. Among the bridge wires 11C bridged between the front wire 11A and the rear wire 11B, the two bridge wires 11C arranged at both end sides in the seat width direction are arranged at end positions, which are just inner sides of the respective side frames 3F1 of the cushion frame 3F, with being bridged between the respective end portions of the front wire 11A and the rear wire 11B. Thereby, the contour mat 11 has a shape which extends over a wide range within the range of the cushion frame 3F.

As shown in FIG. 5, the respective steel rods configuring the contour mat 11 have a configuration having flexibility (elasticity) which keeps its straightly extending shape at a free state so as to support a center pad part 3Pc of the cushion pad 3P (described later) which is set on the steel rods, from the lower side, but when the passenger sits on the seat cushion 3 and a load is thus applied to the steel rods, elastically supports the pad part 3Pc of the cushion pad 3P from the lower side while the steel rods are pressed and slightly bent downward.

As shown in FIG. 2, the hanging wire 12 has such a configuration that one steel rod is bent into an inverted V shape obliquely protruding in the front-upper direction and both ends thereof are integrally connected to the front wire 11A of the contour mat 11. The hanging wire 12 is configured such that the center bent part protruding into the inverted V shape is positioned at the center portion of the contour mat 11 in the seat width direction. Thereby, the center bent part protruding into the inverted V shape of the hanging wire 12 is hung to the step part of the step pin 3F2c1, which is attached to the inclined part 3F2c of the front panel 3F2, from the upper side, so that the center front end portion of the connected contour mat 11 in the seat width direction is rotatably axis-connected to a center portion of the inclined part 3F2c of the front panel 3F2 in the seat width direction.

The plurality of springs 13 are configured by three springs including one tension spring 13A having high tensile strength and two tension springs 13B having low tensile strength arranged at both sides of the one tension spring. The one tension spring 13A having high tensile strength includes a front end portion which is hung to a bent part 11B1, which is formed at the center portion of the rear wire 11B of the contour mat 11 in the seat width direction and is rearwards bent into a V shape, and a rear end which is inserted and hung into a small hole 3F3a, which is formed on an upper surface of a center portion of the rear pipe 3F3 in the seat width direction. Also, the two tension springs 13B having low tensile strength arranged at both sides of the one tension spring have front ends which are hung to bent parts 11B2, which are formed at left and right sides of the rear wire 11B of the contour mat 11 and are rearwards bent into a V shape, and rear ends which are inserted and hung into small holes 3F3a, which are formed on the upper surface of left and right sides of the rear pipe 3F3. By the tensile forces of the springs 13, the rear wire 11B of the contour mat 11 are straightly tensioned from the rear and elastically hung to the rear pipe 3F3 at three portions in the seat width direction.

Specifically, the rear wire 11B of the contour mat 11 is strongly hung from the rear side thereof by the one tension spring 13A having high tensile strength at the center portion in the seat width direction. Thereby, the rear wire 11B is axis-rotatably supported such that both the left and right sides can be swung up and down about the hung center part in the seat width direction (refer to FIGS. 6 to 8). Thus, as shown in FIGS. 2 and 3, by the axis support of the hanging wire 12 at the front side and the axis support of the tension spring 13A having high tensile strength at the rear side, the contour mat 11 is axis-supported such that the respective front and rear end portions thereof can be rotated around the same axis and can be axis-rotated such that both left and right sides thereof are swung up and down around the axes, within the range of the cushion frame 3F.

At a usual state, a rotational posture of the contour mat 11 relative to the cushion frame 3F is such that left and right heights are the same by the spring forces of the two left and right tension springs 13B having low tensile strength. When a sitting passenger sits on the center pad part 3Pc of the cushion pad 3P with a usual sitting posture and the load is applied thereto, the load is applied evenly at left and right sides. Thereby, the whole contour mat 11 comes down as the springs 13 are bending-deformed. However, the contour mat 11 keeps the rotational posture where the left and right heights are the same (refer to FIG. 6). Therefore, at the usual state, the sitting posture of the passenger is stabilized by the support of the contour mat 11.

Figure 7:
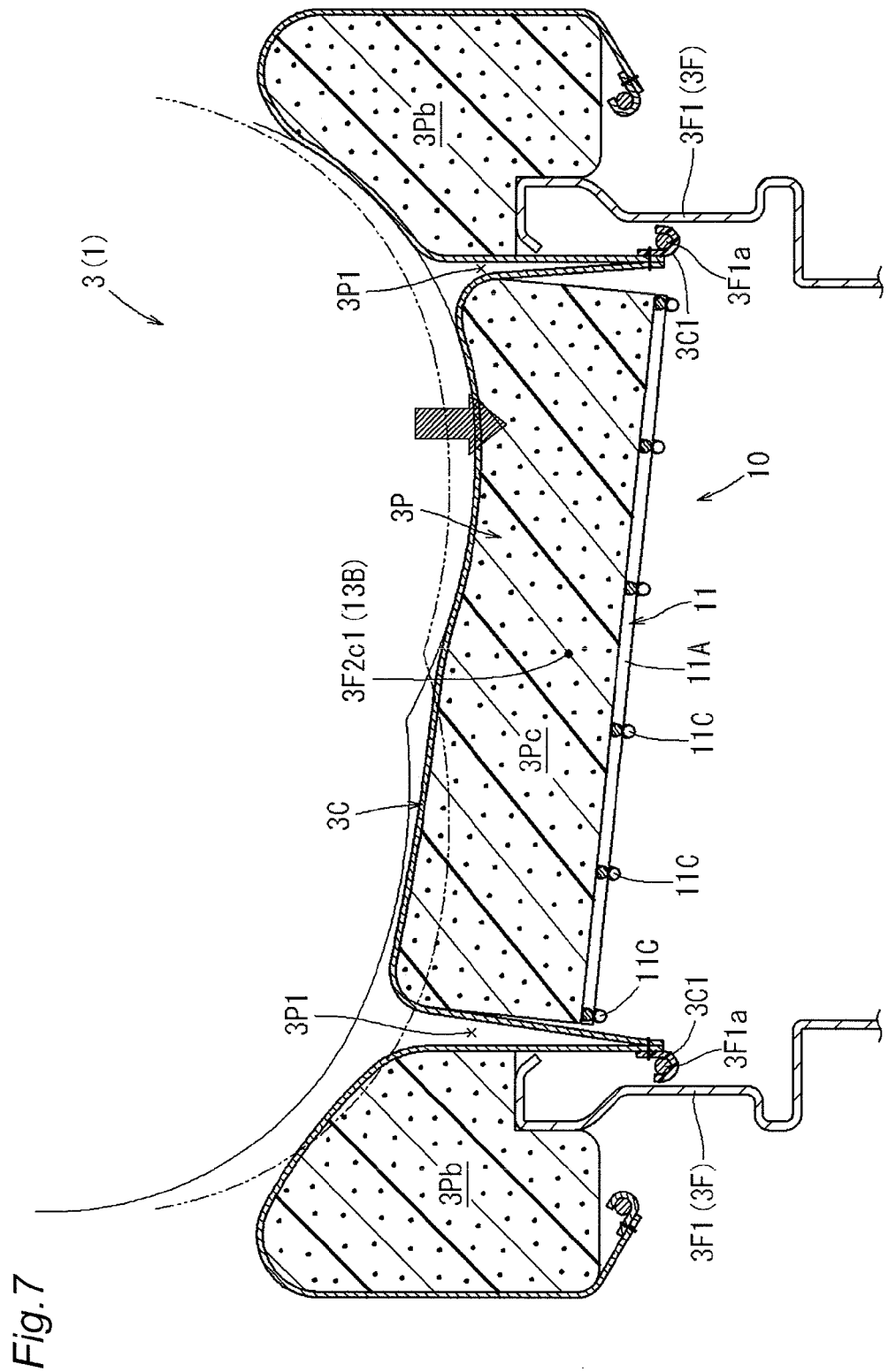
FIG. 7 is a sectional view showing a state where a passenger raises a left hip part (the body weight is applied to the right)
Figure 8:
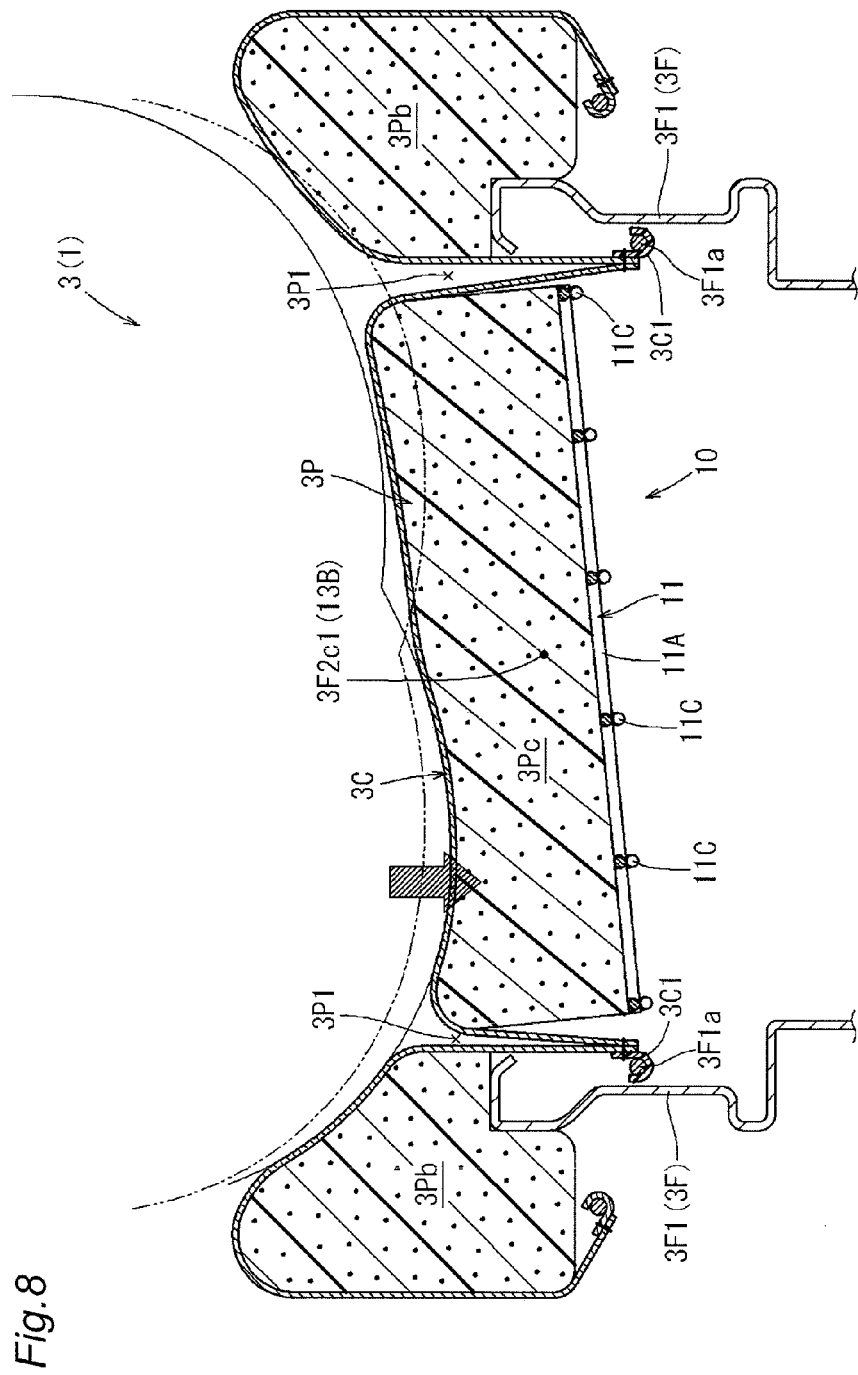
FIG. 8 is a sectional view showing a state where the passenger raises a right hip part (the body weight is applied to the left)
Figure 9:
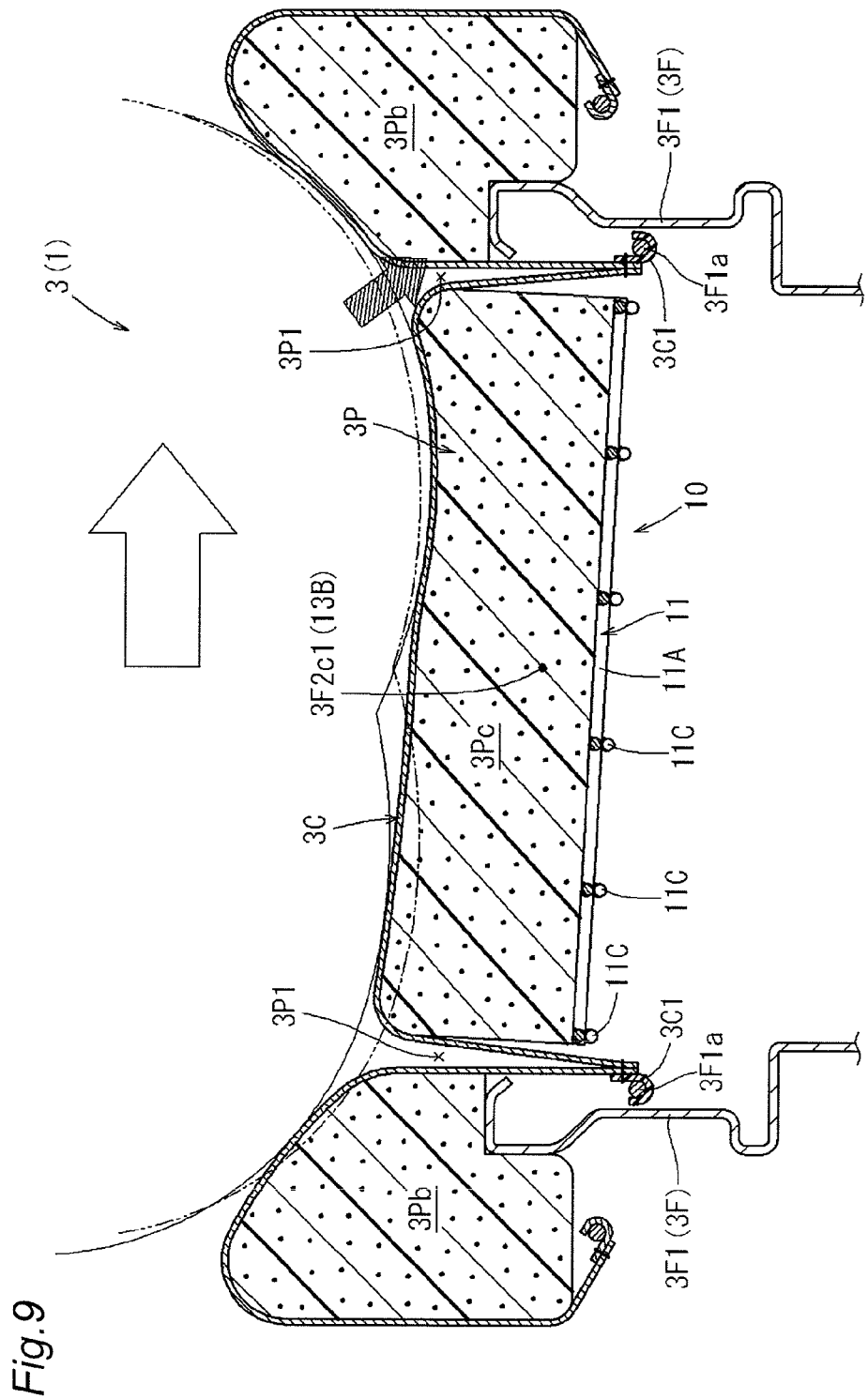
FIG. 9 is a sectional view showing a state where the passenger receives a lateral rightward load (the body weight is applied to the right)
Figure 10:
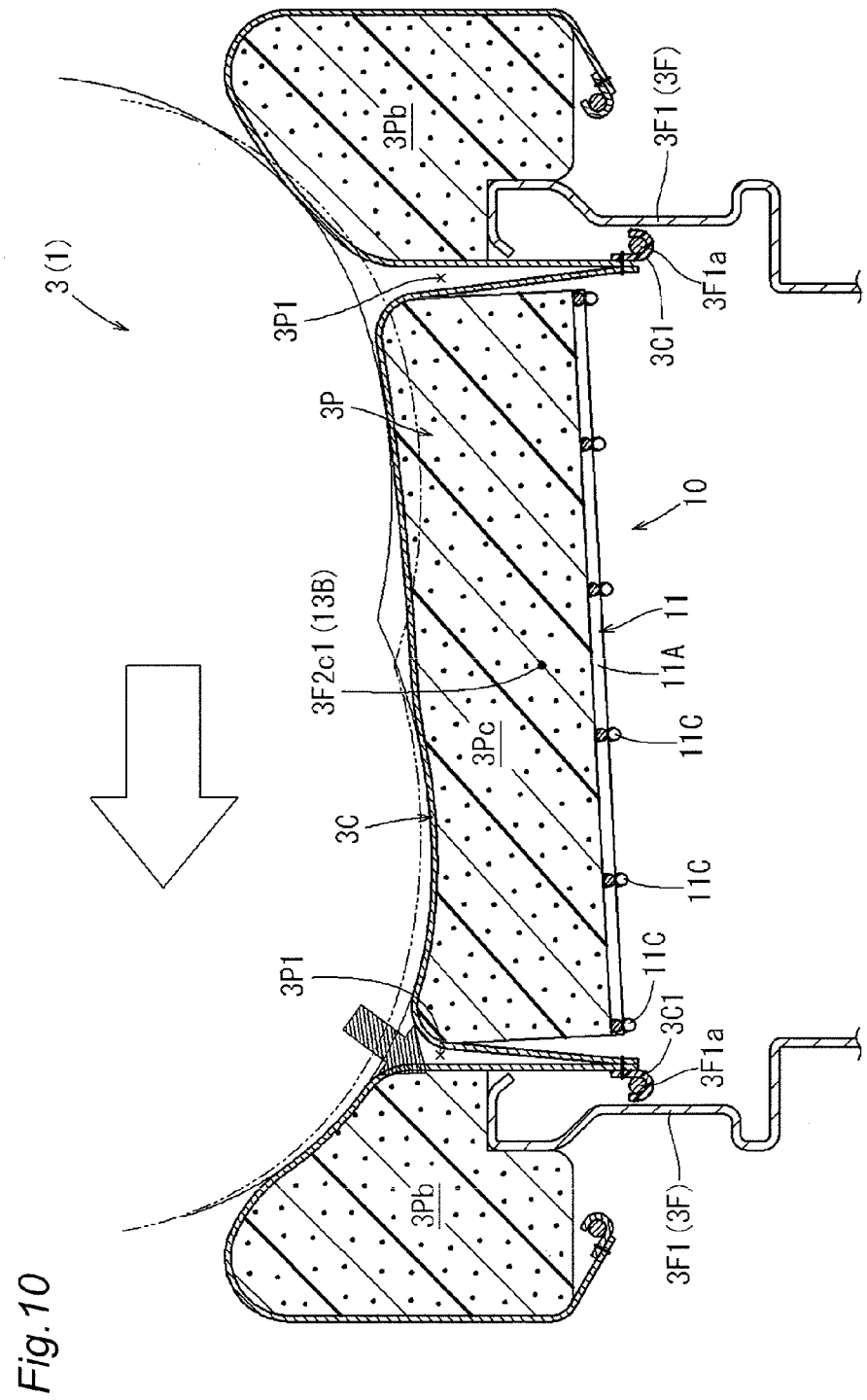
FIG. 10 is a sectional view showing a state where the passenger receives a lateral leftward load (the body weight is applied to the left)

However, as shown in FIGS. 7 and 8, when the passenger sitting on the seat cushion 3 moves its position on the seat cushion 3 so as to change the sitting posture, that is, for example, makes a posture change of raising one hip part to thus unevenly apply the load, the uneven load is applied to the right or left region part which is a support point of the posture change, so that the support body 10 is tilted. Specifically, when the uneven load is applied to the left or right region part of the center pad part 3Pc of the cushion pad 3P, the support body 10 is downwards pressed and is thus tilted by the center pad part 3Pc. Also, as shown in FIGS. 9 and 10, when the passenger sitting on the seat cushion 3 receives a centrifugal force in the left or right direction as a traveling vehicle rounds a curve and thus makes a posture change of laterally swinging the pelvis about the lumbar, the uneven load is applied to the right or left region part, so that the support body 10 is tilted.

Figure 6:
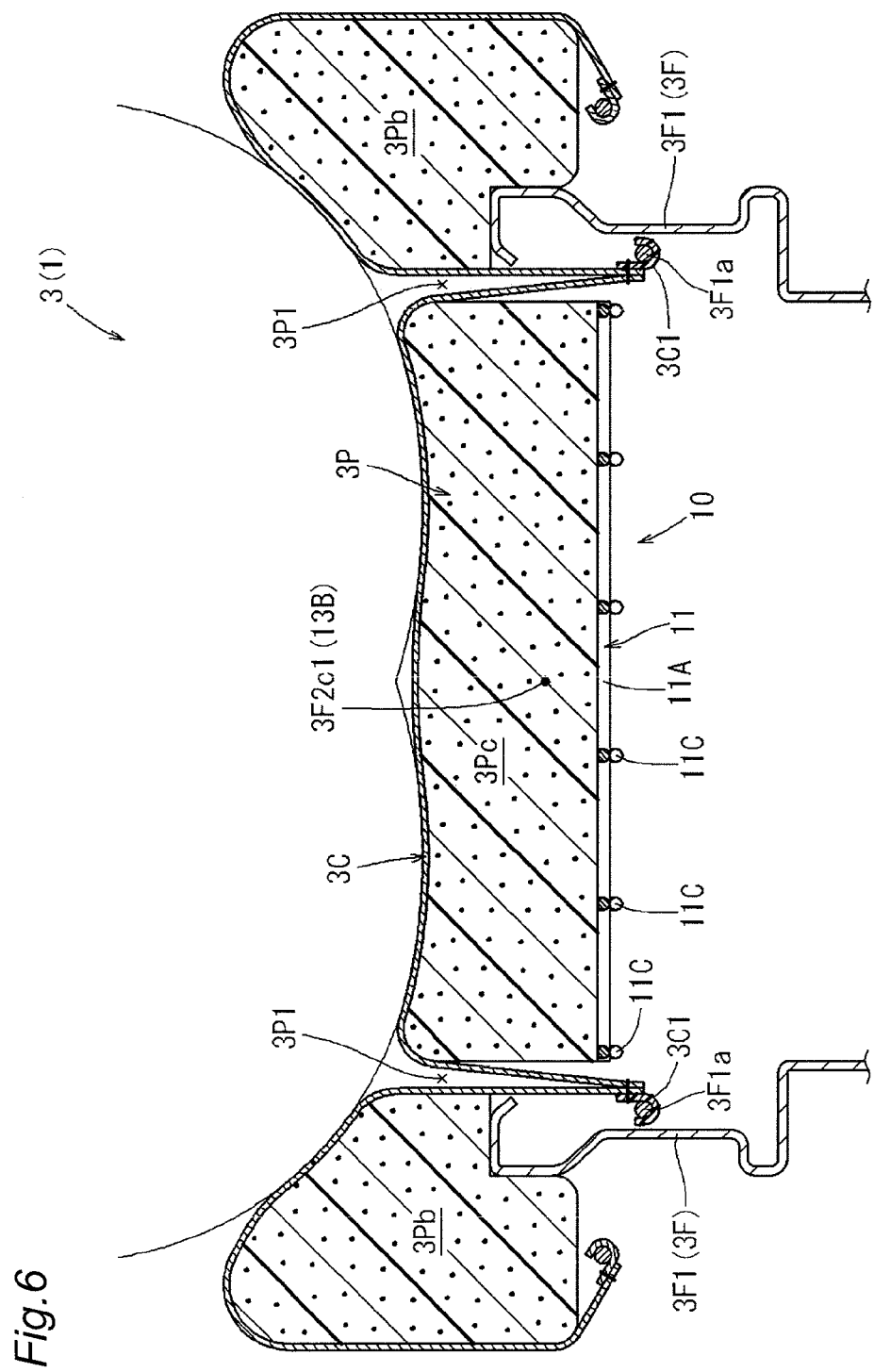
FIG. 6 is a sectional view taken along a line VI-VI of FIG. 1.

Thereby, the region part of the center pad part 3Pc, to which the load is applied, is weakened as regards the support by the support body 10, so that the body pressure of the sitting passenger which is applied to such region part is weakened. Accordingly, the retardation of the blood flow, which is caused when the body pressure of the sitting passenger is continuously applied to the same part of the seat cushion 3 for a long time, is solved, so that the blood flow is promoted. Therefore, after that, when the sitting passenger lowers the raised hip part and returns to a former posture state, the support body 10 is returned to the original rotational posture state where the left and right heights are the same, as shown in FIG. 6. As a result, the sitting passenger returns to the former sitting posture at a state where the retardation of the blood flow is solved, so that the sitting passenger can return to a stable posture state where the passenger is supported evenly at left and right sides by the support body 10 from the lower side.

Incidentally, as described above in FIG. 2, the support body 10 is supported to the cushion frame 3F such that the hanging wire 12 is hung to the step pin 3F2c1 at the front side thereof and the support body 10 is axis-supported. Thereby, the support body 10 is restrained from moving laterally in the seat width direction and is permitted only to axis-rotate. Also, the support body 10 is hung to the rear pipe 3F3 at the rear side thereof by the springs 13, so that the support body 10 can rotate about the part which is hung by the center tension spring 13A having high tensile strength, and can elastically move in the seat width direction against the spring forces of the tensile springs 13A, 13B.

Thereby, as shown in FIG. 5, the support body 10 supports a front part region 3Pc1 of the center pad part 3Pc of the cushion pad 3P supporting the femoral regions such that the front part region 3Pc1 is not laterally moved, in a front side region supporting the femoral regions of the sitting passenger, and supports a rear part region 3Pc2 of the center pad part 3Pc supporting the hip part such that the rear part region 3Pc2 can be elastically moved laterally, in a rear side region supporting the hip part of the sitting passenger. Therefore, when the passenger sitting on the driver seat steps on an accelerator pedal or a brake pedal, the passenger can operate the pedal with a stable posture because the femoral regions is difficult to move laterally. Also, at a usual sitting state, the lateral movement of the hip part is elastically permitted to a certain extent, so that the passenger can easily change the sitting posture in the left or right direction and can thus take a more comfortable sitting posture. Also, as shown in FIG. 2, the rear side region of the support body 10, which supports the hip part of the sitting passenger, is elastically hung to the rear pipe 3F3 by the springs 13. Thereby, the hip part to which the high sitting pressure is applied is enabled to largely sink down by the deformation of the springs 13, so that it is possible to support the hip part at a more comfortable sitting feeling state.

Subsequently, the configuration of the cushion pad 3P is described with reference to FIG. 2. The cushion pad 3P is formed by foam molding a soft polyurethane foam raw material. The cushion pad 3P includes a front pad part 3Pa (an example of a fixed part) which is mounted on the front panel 3F2 of the cushion frame 3F, side pad parts 3Pb (an example of a fixed part) which are mounted on the respective side frames 3F1 of the cushion frame 3F, and a center pad part 3Pc (an example of a movable part) which is mounted on the support body 10 provided within the range of the cushion frame 3F.

Although the center pad part 3Pc has a shape which integrally extends rearwards from the front pad part 3Pa of the cushion pad 3P, slits 3P1 are formed between the center pad part 3Pc and the left and right side pad parts 3Pb, so that the center pad part 3Pc can be deformed independently of the respective side pad parts 3Pb. Also, as shown in FIG. 5, a slit 3P2 which is recessed into a taper shape towards a front surface of the cushion pad is formed at a boundary part between the center pad part 3Pc and the front pad part 3Pa on a backside of the cushion pad over an entire area in the seat width direction. By the slit 3P2, a seam part of the center pad part 3Pc and the front pad part 3Pa is substantially thinned, so that the center pad part 3Pc can be easily bent or distorted independently of the front pad part 3Pa.

As shown in FIG. 2, the rear part region 3Pc2 of the center pad part 3Pc of the cushion pad 3P, which supports the hip part of the sitting passenger, is configured such that a front surface thereof is recessed into a bowl shape, and such that a thickness extending towards a backside is thicker than other parts, as shown in FIG. 5. Thereby, the center pad part 3Pc can favorably receive the hip part of the sitting passenger and enables the hip part having a high sitting pressure to largely sink down in the rear part region 3Pc2 supporting the hip part of the sitting passenger. Accordingly, the center pad part 3Pc can elastically support the sitting passenger with a comfortable sitting feeling. Also, the front part region 3Pc1 of the center pad part 3Pc supporting the femoral regions of the sitting passenger is formed into an inclined shape where a front side thereof is raised to smoothly connect the rear part region 3Pc2 of the center pad part 3Pc and the front pad part 3Pa such that a front surface of the front part region 3Pc1 can support the front sides of the femoral regions of the sitting passenger to raise over the front pad part 3Pa set on the front panel 3F2.

As shown in FIG. 6, each side pad part 3Pb is formed such that it protrudes upwards more than the center pad part 3Pc. Accordingly, the respective side pad parts 3Pb can interpose and support the femoral regions of the sitting passenger therebetween. Specifically, each side pad part 3Pb is formed such that it protrudes obliquely upwards from an edge part of a seat inner side adjacent to the center pad part 3Pc to an edge part of a seat outer side, and is configured such that it obliquely faces and supports both outer sides of the femoral regions of the sitting passenger.

As described above, the cushion pad 3P is mounted on the cushion frame 3F such that the front pad part 3Pa and the respective left and right side pad parts 3Pb are rigidly and stably supported from the lower side at fixed positions by the front panel 3F2 and respective side frames 3F1 of the cushion frame 3F, and the center pad part 3Pc is supported from the lower side by the support body 10 such that the center pad part 3Pc can be moved to follow the movement of the support body 10.

Specifically, the cushion pad 3P is mounted at a state where the front pad part 3Pa and the respective side pad parts 3Pb are set on the front panel 3F2 and the side frames 3F1 of the cushion frame 3F and respectively cover the front panel 3F2 and the side frames 3F1 from the upper side and peripheral side of the seat. After the cushion pad 3P is mounted on the cushion frame 3F, the cushion pad 3P is covered with the cushion cover 3C such that an entire surface (the sitting surface and front, rear, left and right sides) is covered, and respective peripheral parts of the cushion cover 3C are tensioned and fixed to a bottom part of the cushion frame 3F. As a result, by the tension of the cushion cover 3C, the front pad part 3Pa and the respective side pad parts 3Pb are mounted with being strongly pressed and closely contacted to the front panel 3F2 and side frames 3F1 of the cushion frame 3F, and the center pad part 3Pc is also mounted with being strongly pressed and closely contacted on the support body 10.

According to the above mounting, the cushion pad 3P is configured such that the rear part region 3Pc2 of the center pad part 3Pc, to which the strong body pressure is applied from the hip part of the sitting passenger, can smoothly receive the body pressure from the lower side in the rear region part elastically supported by the springs 13 of the support body 10 and the peripheral parts such as the front pad part 3Pa and the respective side pad parts 3Pb are strongly and stably supported at the fixed positions from the lower side by the front panel 3F2 and respective side frames 3F1 of the cushion frame 3F.

Here, the cushion cover 3C is fixed with being tensioned downwards and hung such that a part which covers an undulating part between the center pad part 3Pc and the respective side pad parts 3Pb of the cushion pad 3P, and a part which covers an undulating part between the front part region 3Pc1 and the rear part region 3Pc2 of the center pad part 3Pc are not floated or wrinkled. Specifically, as shown in FIG. 6, the respective parts of the cushion cover 3C which cover portions between the center pad part 3Pc and the respective side pad parts 3Pb of the cushion pad 3P, are tensioned downwards through the respective slits 3P1 formed between the center pad part 3Pc and the respective side pad parts 3Pb of the cushion pad 3P, and hooks 3C1 coupled to seamed tips of the downwards tensioned parts are engaged to engaging wires 3F1a provided at inner side parts of the respective side frames 3F1, so that the cushion cover 3C is fixed with being tensioned in the respective slits 3P1. Also, as shown in FIG. 5, a part of the cushion cover 3C which covers a portion between the front part region 3Pc1 and the rear part region 3Pc2 of the center pad part 3Pc of the cushion pad 3P, is pushed into the center pad part 3Pc through an embedding recess 3Pc3, which is formed on a surface of the boundary part between the front part region 3Pc1 and the rear part region 3Pc2 of the center pad part 3Pc, and a hook (not shown) coupled to the seamed tips of the pushed-in part is engaged to an engaging wire (not shown) provided in the embedding recess 3Pc3, so that the cushion cover 3C is fixed with being tensioned in the embedding recess 3Pc3.

According to the above configuration, the cushion pad 3P can stably support the load of the sitting passenger at the fixed positions on the front pad part 3Pa and the respective side pad parts 3Pb which are supported at the fixed positions from the lower side by the front panel 3F2 and the respective side frames 3F1 of the cushion frame 3F. Therefore, since the passenger sitting on the driver seat is stably supported at the femoral regions by the front pad part 3Pa of the cushion pad 3P, which is not laterally moved, at the usual sitting posture, the passenger can take a comfortable sitting posture. Also, upon the driving operation of stepping on the accelerator pedal or the brake pedal, the femoral regions are stably supported, so that the passenger can perform the operation while maintaining the stable posture and can favorably perform the various driving operations.

Also, when the sitting passenger raises one hip part to thus unevenly apply the load on the center pad part 3Pc which is supported from the lower side by the support body 10 to be tiltable, the cushion pad 3P tilts the support body 10 to follow such movement, thereby appropriately relieving the body pressure applied thereto. Specifically, the center pad part 3Pc of the cushion pad 3P is configured to appropriately relieve the body pressure, as described above, and to support the stable posture state such that the femoral regions of the sitting passenger are not moved laterally or moved downwards by the axis-support structure (the structure where the hanging wire 12 is engaged to the step pin 3F2c1) of the front side of the support body 10 and to enable the hip part of the sitting passenger to sink down to a depth position at which the passenger has a comfortable sitting feeling or to elastically move laterally to a certain extent by the spring support structure (the elastic support structure by the springs 13) of the rear side of the support body 10 when the passenger sits on the seat with the usual sitting posture. Therefore, the passenger sitting on the driver seat is stably supported at the femoral regions by the front part region 3Pc1 of the center pad part 3Pc, which is not laterally moved like the front pad part 3Pa of the cushion pad 3P, at the usual sitting posture, so that the passenger can take a comfortable sitting posture and can favorably perform the driving operation of stepping on the accelerator pedal or the brake pedal.

That is, the seat 1 (the vehicle seat) of this illustrative embodiment is configured to have the cushion frame 3F (the seat frame) which supports the load of the sitting passenger and the cushion pad 3P (the seat pad) which is set on the cushion frame 3F and receives the load of the sitting passenger to be relieved. Also, the support body 10 (the support body) which supports the center pad part 3Pc (a part) of the cushion pad 3P from the backside is supported to the cushion frame 3F. The support body 10 is supported to the cushion frame 3F to be axially rotatable in an out-of-plane direction of a plane (a direction perpendicular to the plane) supporting the load of the sitting passenger, thereby allowing a movement of relieving the load of the sitting passenger. The cushion pad 3P is configured to include the front pad part 3Pa and side pad parts 3Pb (fixed part), which are supported at the fixed positions by the cushion frame 3F, and the center pad part 3Pc (the movable part), which is supported to be movable by the support body 10.

According to the above configuration, the load of the sitting passenger is stably received at the fixed positions of the front pad part 3Pa and respective side pad parts 3Pb of the cushion pad 3P through the support of the cushion frame 3F, and the load accompanied by the posture change of the sitting passenger is received to be relieved at the center pad part 3Pc of the cushion pad 3P through the support of the support body 10. Therefore, it is possible to maintain the stable sitting quality at the front pad part 3Pa and respective side pad parts 3Pb of the cushion pad 3P and to appropriately relieve the body pressure at the center pad part 3Pc of the cushion pad 3P in conformity with the passenger movement of changing the posture.

Specifically, the support body 10 is configured such that the center part thereof in the width direction is axis-supported to the cushion frame 3F and the respective left and right parts thereof are tilted to follow the movement of the load which is unevenly applied to the left and right sides of the sitting passenger. According to this configuration, at the state where the sitting passenger applies the load to the cushion pad 3P at the usual sitting posture, the support body 10 is kept at the balanced posture state where the left and right heights are the same with the load being evenly applied at left and right sides. Hence, the usual sitting posture of the sitting passenger is more stabilized. Also, when the sitting passenger changes the posture by raising one hip part to thus unevenly apply the load to any one of the left and right sides, the uneven load is applied to the surface part of the side which is the support point of the posture change, so that the support body 10 is tilted. According to this configuration, the passenger can easily change the sitting posture while maintaining the more stable sitting quality, and the body pressure can be appropriately relieved in conformity with the passenger movement.

Specifically, the support body 10 includes the one end (the front end) of the center part in the width direction, which is rotatably axis-supported to the cushion frame 3F, and the other end (the rear end) which is elastically hung to the cushion frame 3F and is supported in the tilting direction by the springs 13 (the plurality of springs). According to this configuration, the support body 10 is restrained from being moved in the seat width direction in the vicinity of the one end (the front end) which is axis-supported to the cushion frame 3F and can be moved in the seat width direction against the elastic force in the vicinity of the other end (the rear end) which is elastically hung to the cushion frame 3F. Hence, according to this configuration, the support body 10 can appropriately support the part, at which it is desired to strongly restrain the lateral movement of the body, such as the femoral regions of the sitting passenger, and the part, at which it is desired to flexibly permit the lateral movement of the body, such as the hip part, respectively. Therefore, it is possible to further improve the sitting quality at the usual sitting posture.

Accordingly, when the above configuration is applied to the seat cushion 3 of the driver seat on which the passenger steps on the accelerator pedal or the brake pedal, the lateral movement of the femoral regions is restrained to more stabilize the driving posture and the lateral movement of the hip part is flexibly permitted to a certain extent to make the sitting quality more comfortable. Also, when the driver operates a steering wheel leftwards or rightwards, the body is unintentionally swung leftwards or rightwards, so that the one hip part is raised or returned. At this time, according to the above configuration, the body pressure is appropriately relieved or the pelvis is rotated and moved about the lumbar, so that it is possible to unintentionally appropriately solve the retardation of the blood flow.

Also, the slits 3P1, 3P2 (the slit) for enabling the center pad part 3Pc to easily follow the movement of the support body 10 are formed at the boundary part between the center pad part 3Pc (the movable part) of the cushion pad 3P and the front pad part 3Pa (the fixed part) and at the boundary part between the center pad part 3Pc (the movable part) of the cushion pad 3P and the respective side pad parts 3Pb (the fixed part). According to this configuration, since the fixed part (the front pad part 3Pa and side pad parts 3Pb) and the movable part (the center pad part 3Pc) of the cushion pad 3P are difficult to follow the mutual movement, it is possible to stabilize the fixed part (the front pad part 3Pa and side pad parts 3Pb) at the fixed position more easily and to enable the movable part (the center pad part 3Pc) to follow the movement of the support body 10 more easily. Hence, the passenger can easily change the sitting posture while maintaining the more stable sitting quality, and the body pressure can be appropriately relieved in conformity with the passenger movement.

Second Illustrative Embodiment

Figure 11:
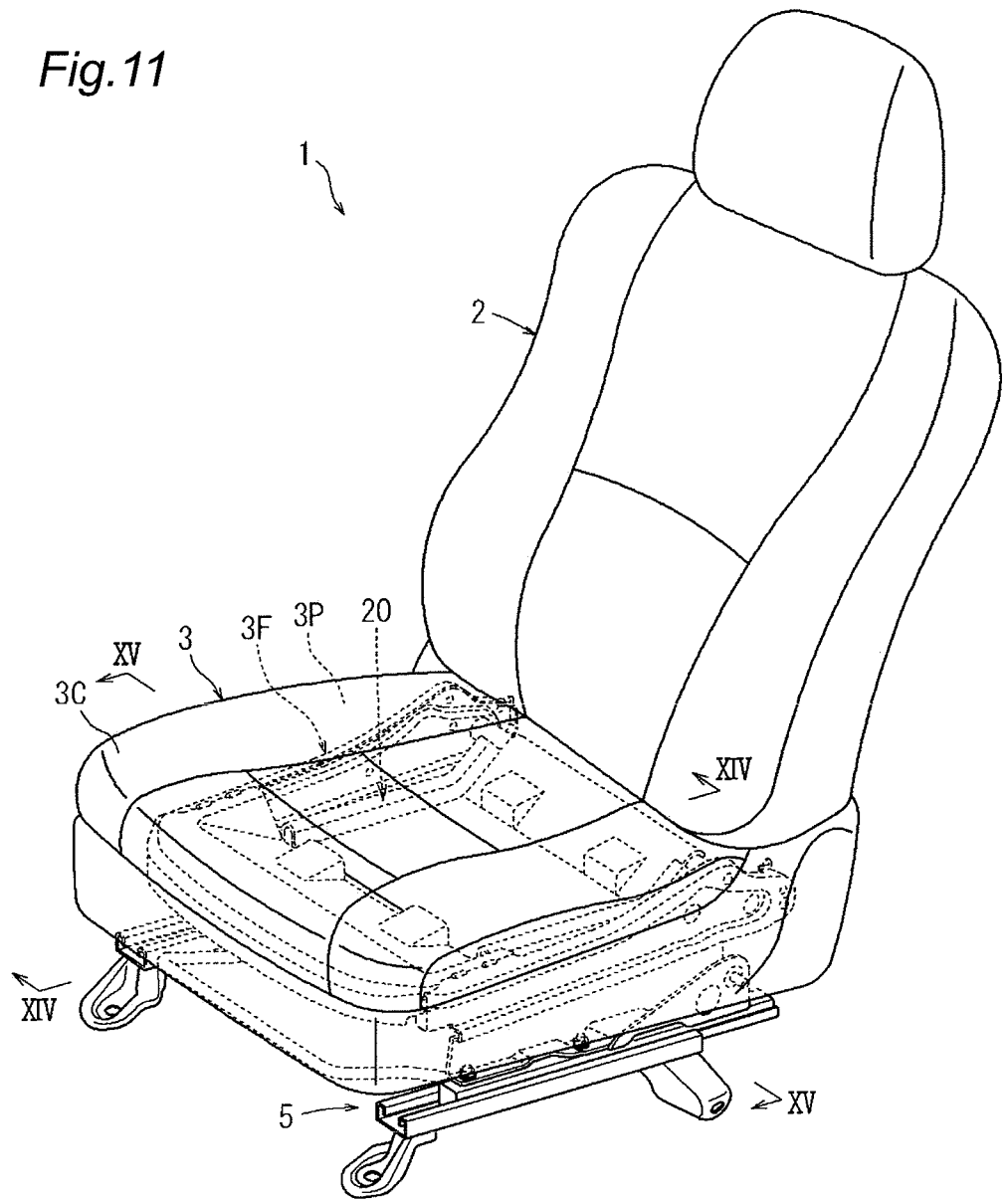
FIG. 11 is a perspective view showing a schematic configuration of a vehicle seat according to a second illustrative embodiment.
Figure 12:
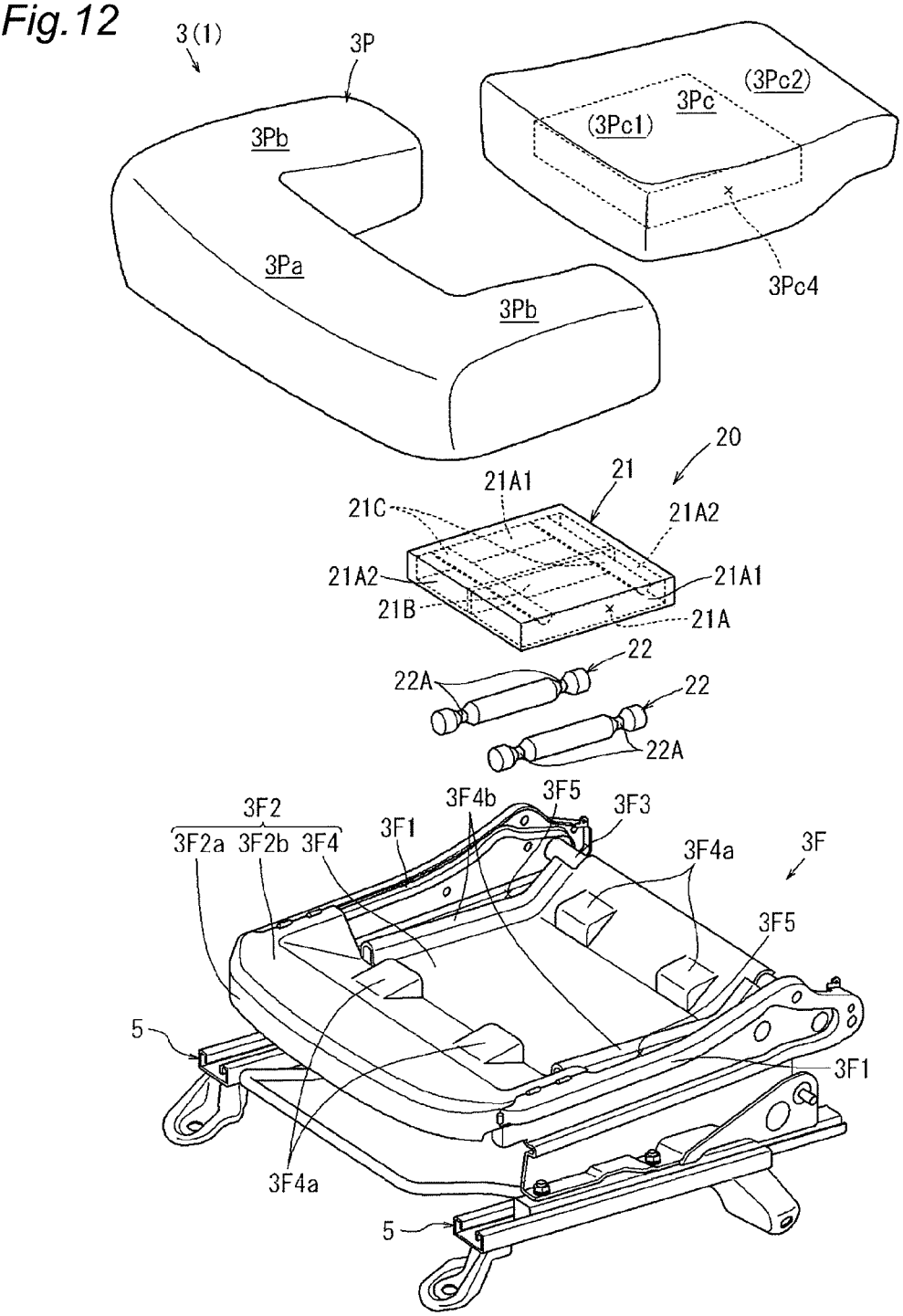
FIG. 12 is an exploded perspective view of a seat cushion.

In the below, a configuration of the seat 1 according to a second illustrative embodiment is described with reference to FIGS. 11 to 20. As shown in FIG. 11, the seat 1 of this illustrative embodiment is configured as a driver seat of a vehicle, like the seat 1 described in the first illustrative embodiment, and includes the seat back 2 which is a back support part of a sitting passenger and the seat cushion 3 which is a sitting part. As shown in FIG. 12, the seat cushion 3 is provided on the vehicle floor via the pair of left and right slide rails 5 and a seat position in the seat front-rear direction relative to the floor can be adjusted by the slide rails 5.

As shown in FIG. 11, the seat back 2 is connected to the rear end portion of the seat cushion 3 via recliners (not shown), and the standing angle (the back support angle) thereof relative to the seat cushion 3 can be adjusted in the seat front-rear direction by operations of the recliners. In the meantime, since the configurations of the respective slide rails 5 and the recliners are similar to those disclosed in JP-A-2010-221935, the descriptions of the specific configurations are omitted.

Figure 13:
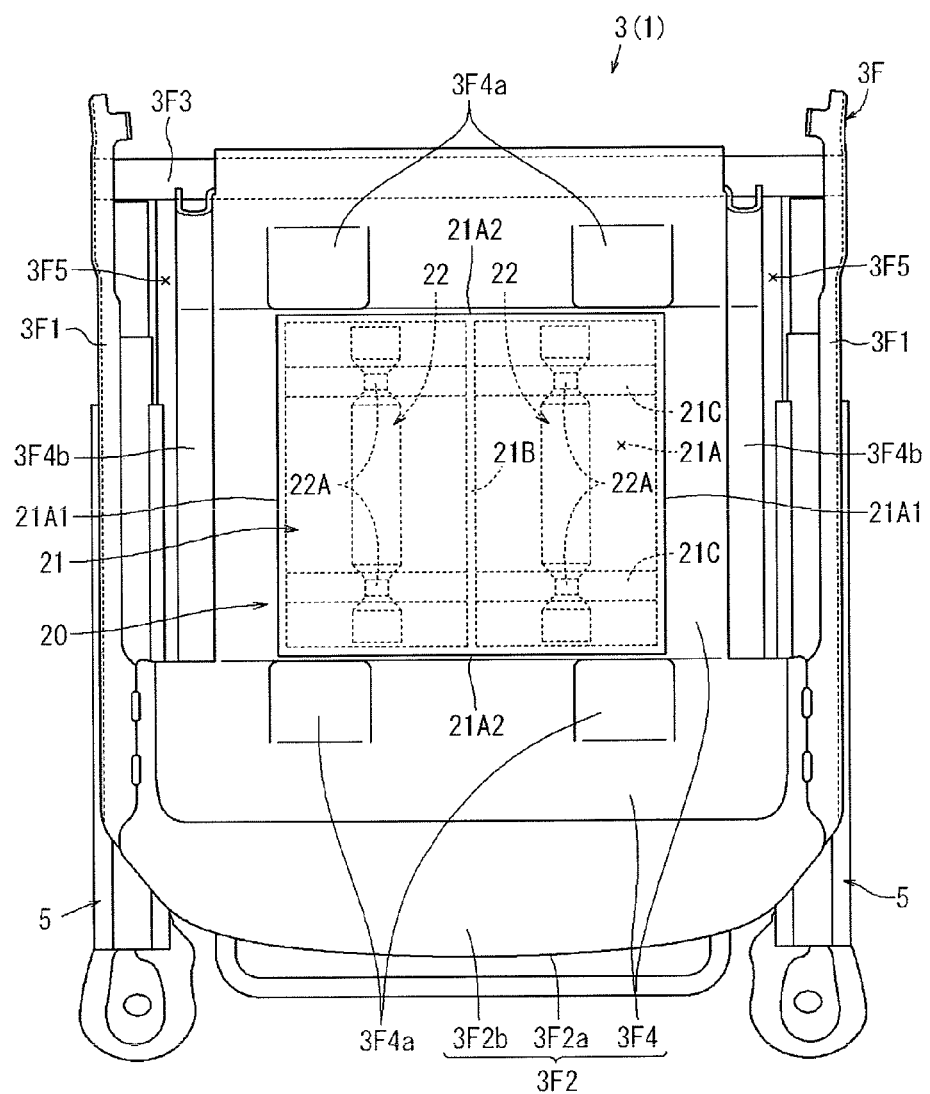
FIG. 13 is a plan view of a cushion frame.

As shown in FIGS. 12 and 13, the seat cushion 3 includes the cushion frame 3F (an example of a seat frame) forming an internal skeleton thereof, a support body 20 which is mounted on a cushion pan part 3F4 of the cushion frame 3F, the cushion pad 3P (an example of a seat pad) which is supported to supported to the cushion frame 3F and the support body 20 from a lower side (a backside) and gently receives the load of the sitting passenger, and the cushion cover 3C (refer to FIG. 11) which is made of fabric covering an entire surface of the cushion pad 3P.

The cushion frame 3F has a quadrangle shape conforming to a periphery shape of the seat cushion 3. Specifically, the cushion frame 3F includes the pair of left and right side frames 3F1 made of a steel plate long in the seat front-rear direction, the front panel 3F2 made of a steel plate which is integrally bridged between the front end portions of the side frames 3F1, the rear pipe 3F3 made of a round steel pipe which is integrally bridged between the rear parts of the side frames 3F1, and the plate-shaped cushion pan part 3F4 extending from the front panel 3F2 in the seat rear direction such that the cushion pan part 3F4 is bridged between the front panel 3F2 and the rear pipe 3F3.

As shown in FIG. 12, each side frame 3F1 has such a shape that the upper edge part and the intermediate part thereof are bent towards an inside of the seat such that structural strength against the bending or torsion is improved, and the lower edge part thereof is integrally connected to the upper part of the upper rail of each slide rail 5 (refer to FIG. 12). The front panel 3F2 is strongly integrally connected to the upper face parts and front face parts of the respective side frames 3F1 by spot welding with being brought into contact with the same so as to connect the front end portions of the respective side frames 3F1 each other. Here, the front panel 3F2 includes the front plate part 3F2*a* facing the front of the seat, the top plate part 3F2*b* facing the upper of the seat, and the plate-shaped cushion pan part 3F4 which descends in a step shape from the rear edge part of the top plate part 3F2*b* in the rear direction of the seat.

The front plate part 3F2*a* includes the left and right edge parts which are respectively bent in the rear direction of the seat so as to follow the periphery shape of the front face of the seat cushion 3, and the respective edge portions of the bent ends are strongly integrally connected to the front face parts of the respective side frames 3F1 by the spot welding with being brought into contact with the same. The top plate part 3F2*b* includes the left and right edge parts which are strongly integrally connected at the two front and rear portions thereof to the upper face parts of the respective side frames 3F1 by the spot welding with being placed on the upper face parts of the respective side frames 3F1.

The cushion pan part 3F4 descends in a step shape from the rear edge part of the top plate part 3F2*b* of the front panel 3F2 in the rear direction of the seat. The cushion pan part 3F4 has a shape having a wide plate width covering a most area between the side frames 3F1 in the seat width direction. However, gaps 3F5 are formed for pushing the cushion cover 3C into portions between the cushion pan part 3F4 and the respective side frames 3F1. The cushion pan part 3F4 includes a rear edge part which is strongly integrally connected to the upper face part of the rear pipe 3F3 by the welding. The cushion pan part 3F4 is formed at left and right portions of respective front and rear edge parts descending in a step shape with guide protrusions 3F4*a* which are extrusion-formed upwards, restrain forward and rearward movement of a roller guide 21 (described later) of the support body 20 and slidably guide the roller guide 21 so as to straightly move in the seat width direction. Also, the cushion pan part 3F4 is formed at both edge parts in the seat width direction with edge stoppers 3F4*b* which function as an engaging part of restraining a movable area of the roller guide 21 in the seat width direction by abutting and has an inverted U-shape protruding upwards.

Figure 14:
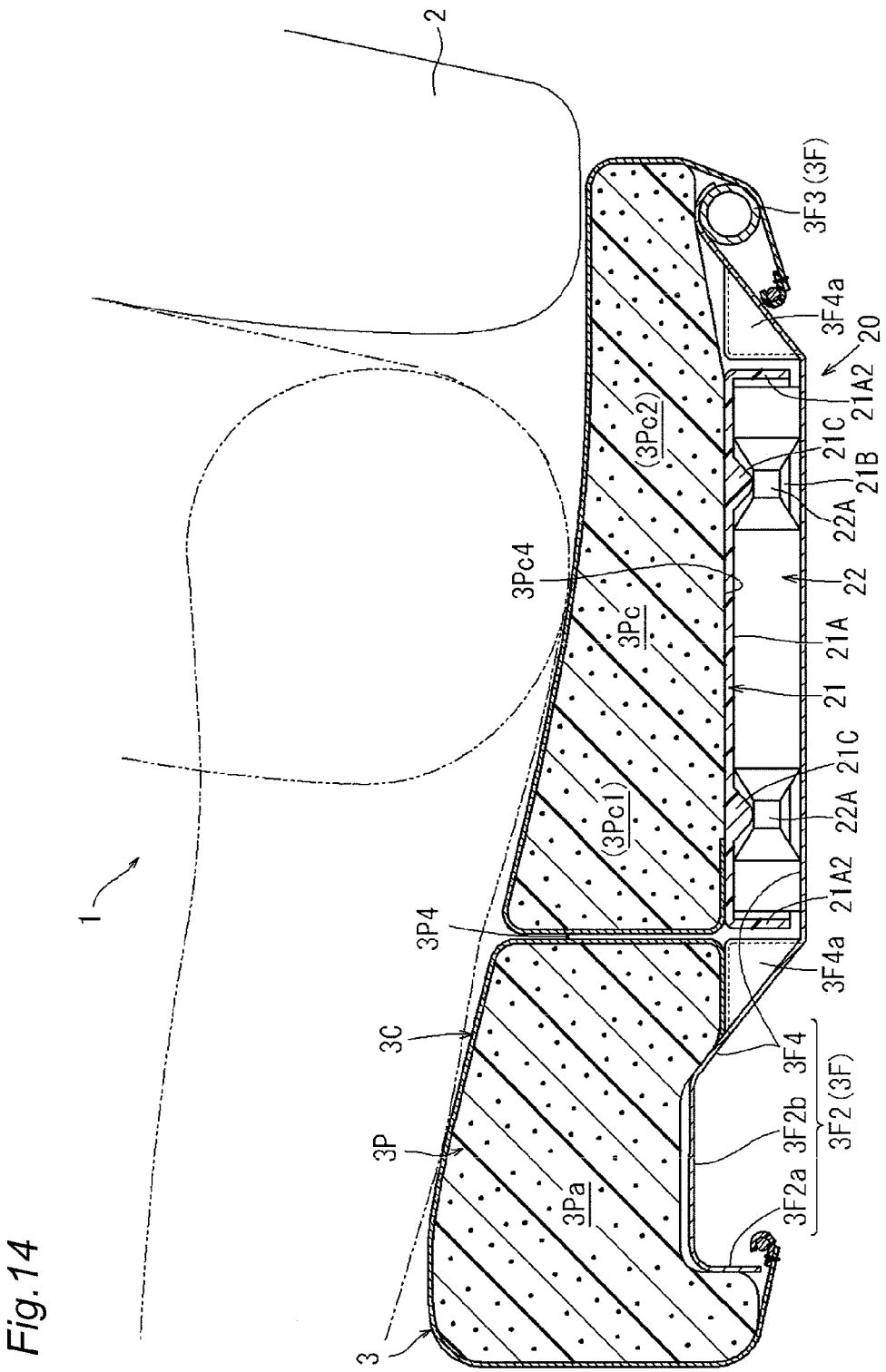
FIG. 14 is a sectional view taken along a line XIV-XIV of FIG. 11.

As shown in FIG. 14, the front plate part 3F2*a* of the front panel 3F2, which faces the front of the seat, forms the front face skeleton of the seat cushion 3. Also, the top plate part 3F2*b* of the front panel 3F2, which faces the upper of the seat, forms the upper face skeleton of the front end portion area of the seat cushion 3 supporting the vicinity of the front ends of the femoral regions of the sitting passenger. The top plate part 3F2*b* is formed at a position higher than the upper face of the cushion pan part 3F4 supporting the hip part of the sitting passenger from the lower and the support body 20 mounted on the upper face of the cushion pan part so that the top plate part 3F2*b* supports the front side of the femoral regions of the sitting passenger to be raised.

As shown in FIG. 12, the support body 20 includes the box-shaped roller guide 21 which is opened downwards, and two cylindrical rollers 22 which are accommodated in a recess portion 21A formed on a bottom face part of the roller guide 21 and are interposed between the roller guide 21 and the upper face of the cushion pan part 3F4. The roller guide 21 is formed by resin integration molding and is formed on the bottom face part with the recess portion 21A in which the two rollers 22 are accommodated so as to roll in the seat width direction. The recess portion 21A is formed over a substantially entire area of the bottom face part, except for a peripheral part of the roller guide 21. As the recess portion 21A is formed, the bottom face part of the roller guide 21 is formed with left and right sidewall parts 21A1 and front and rear sidewall parts 21A2 having a shape standing downwards in a wall shape (refer to FIGS. 14 and 15).

Figure 15:
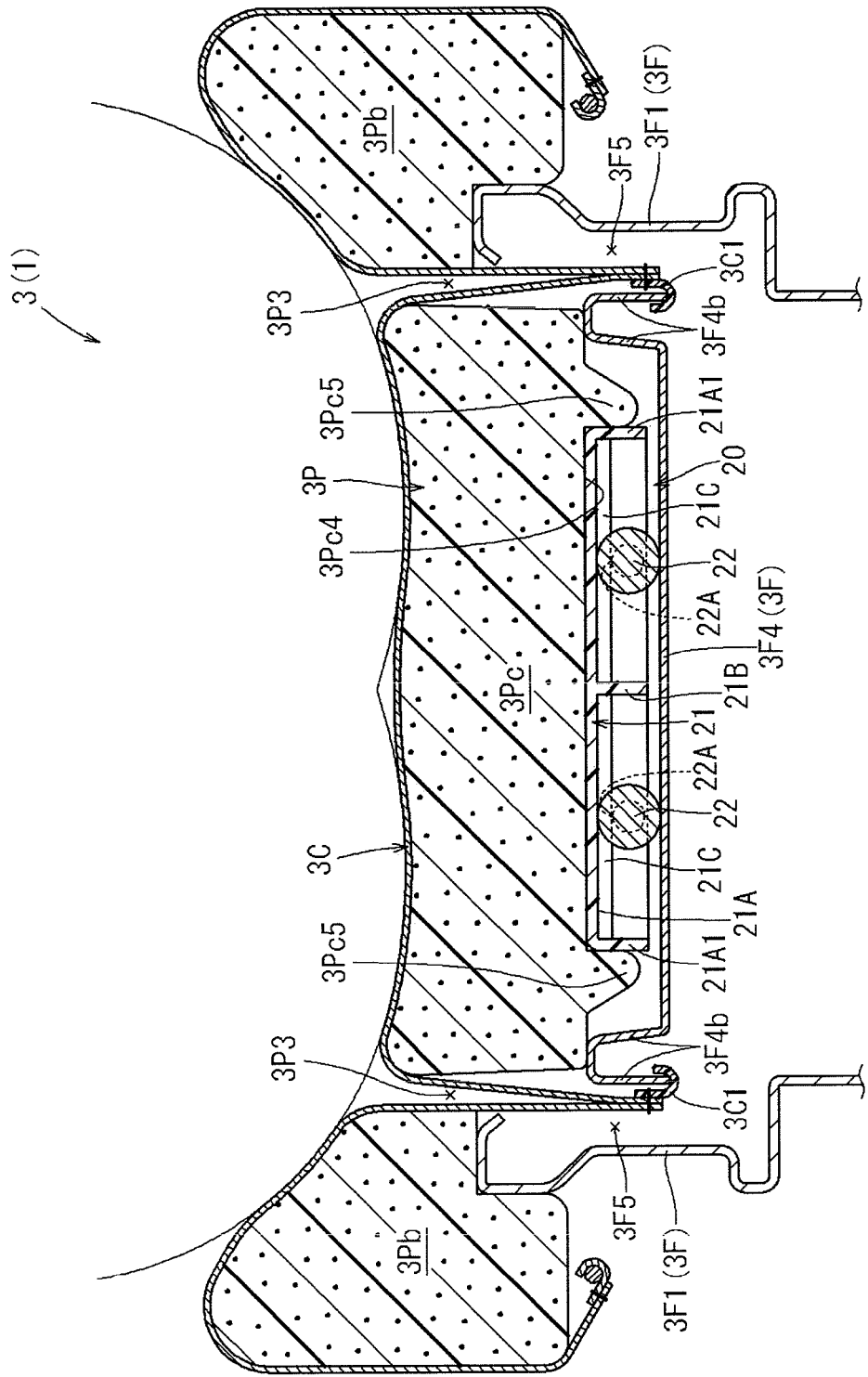
FIG. 15 is a sectional view taken along a line XV-XV of FIG. 11.

Also, as shown in FIG. 15, the bottom face part of the roller guide 21 is formed with a partition rib 21B which partitions the recess portion 21A into two left and right areas and has a shape standing in a wall shape along a center line in the recess portion 21A in the seat width direction. Also, as shown in FIG. 14, the bottom face part of the roller guide 21 is formed with guide ribs 21C which are brought into contact with neck portions 22A, which are formed at front and rear portions of each roller 22 accommodated in the recess portion 21A, and guide the respective rollers 22 such that the rollers 22 are straightly rolled in the seat width direction in the recess portion 21A. The guide ribs 21C are formed to have a triangular shape protruding downwards from a top plate face of the recess portion 21A at a front position and a rear position in the recess portion 21A so that the guide ribs are introduced into the neck portions 22A of the respective rollers 22, and are also formed to have a projection shape straightly extending in the seat width direction over an entire area in the recess portion 21A in the seat width direction.

As shown in FIG. 15, the roller guide 21 is configured such that the recess shape having the box shape overlaps with and is accommodated in a recess portion 3Pc4 (described later) formed on a bottom face part of the center pad part 3Pc of the cushion pad 3P and is integrally connected to a backside of the center pad part 3Pc. Thereby, both the left and right sidewall parts 21A1 of the roller guide 21 are covered from both outer sides thereof by respective sidewall parts 3Pc5, which are formed in a wall shape standing from both left and right side parts in the recess portion 3Pc4 of the center pad part 3Pc.

Also, the respective rollers 22 are arranged one by one in the respective areas partitioned by the partition rib 21B in the recess portion 21A of the roller guide 21. Thereby, each roller 22 can individually freely roll in the seat width direction between the partition rib 21B and the left or right sidewall part 21A1 in each of the partitioned left and right areas in the recess portion 21A. Each roller 22 has a diameter larger than a depth (height) of the recess portion 21A of the roller guide 21 and is accommodated and set in the recess portion 21A of the roller guide 21, so that it is interposed between the top plate face of the recess portion 21A and the upper face of the cushion pan part 3F4. The rollers 22 are rolled to slide the roller guide 21 in each rolling direction of the seat width direction (refer to FIGS. 16 and 17). Here, the cushion pan part 3F4 has a face shape which is flat in the seat width direction and is configured such that the respective rollers 22 straightly roll in the seat width direction.

As shown in FIG. 14, the roller guide 21 is provided above a center plane of the cushion pan part 3F4, which flatly extends in the seat width direction. Specifically, the roller guide 21 is accommodated between front and rear arrangement areas of the guide protrusions 3F4*a* formed at the respective front and rear edge portions of the cushion pan part 3F4 and are provided such that the roller guide 21 can be straightly slid and guided in the seat width direction above the cushion pan part 3F4 with the front and rear sidewall parts 21A2 being brought into contact with the respective guide protrusions 3*f*4*a* from the front and rear sides.

As shown in FIG. 14, the respective rollers 22 are interposed and set between the roller guide 21 and the cushion pan part 3F4 at a state where the respective guide ribs 21C protruding from the bottom face part of the roller guide 21 are brought into contact with the respective neck portions 22A, which are annularly necked at the two front and rear portions of the respective rollers, in the respective left and right partitioned areas in the recess portion 21A of the roller guide 21. Thereby, each roller 22 is provided between the roller guide 21 and the cushion pan part 3F4 such that it can be straightly rolled and guided in the seat width direction relative to the roller guide 21.

Figure 16:
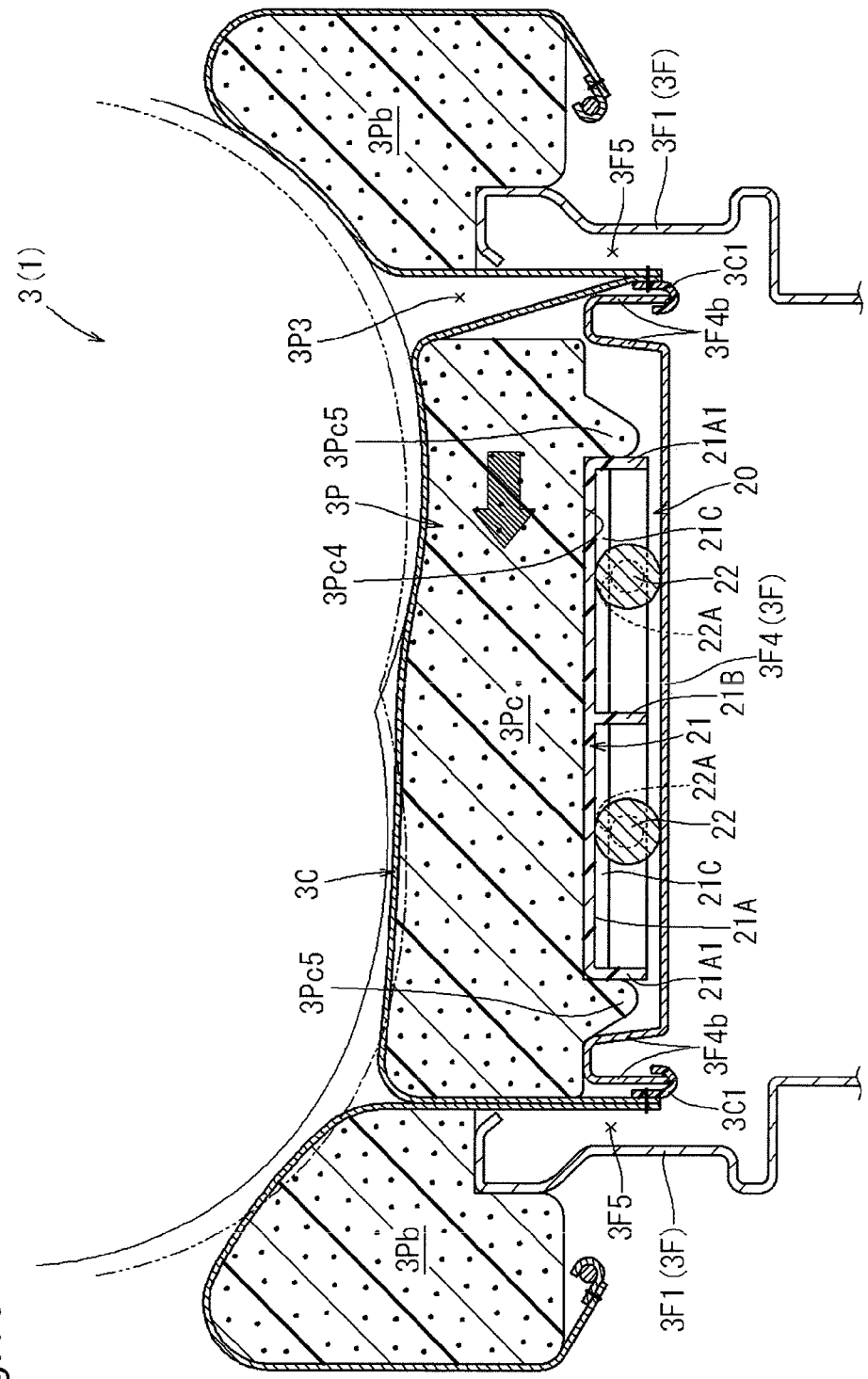
FIG. 16 is a sectional view showing a state where a passenger raises a left hip part (the body weight is applied to the right)
Figure 17:
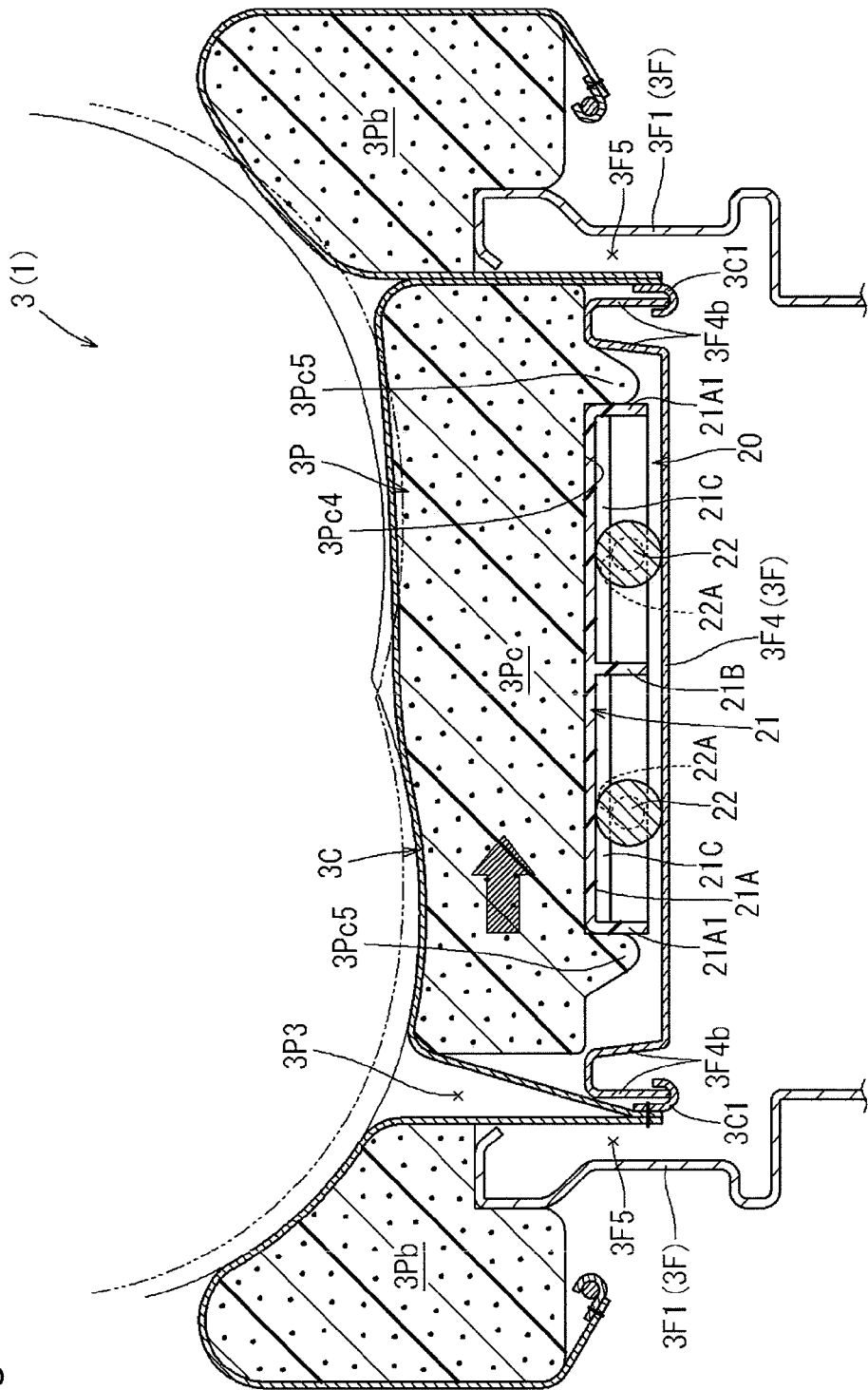
FIG. 17 is a sectional view showing a state where the passenger raises a right hip part (the body weight is applied to the left)

According to the above configuration, as shown in FIGS. 15 to 17, the support body 20 is guided above the cushion pan part 3F4 such that the roller guide 21 supporting the center pad part 3Pc of the cushion pad 3P from the lower can be smoothly slid in the seat width direction above the cushion pan part 3F4 as the respective rollers 22 are rolled. A movable range of the roller guide 21 relative to the cushion pan part 3F4 in the seat width direction is a range between positions at which the left and right sidewall parts 21A1 of the roller guide 21 are contacted and engaged to the left and right edge stoppers 3F4b of the cushion pan part 3F4. However, the left and right sidewall parts 3Pc5 of the recess portion 3Pc4 formed on the backside of the center pad part 3Pc of the cushion pad 3P protrude at the outer sides of the left and right sidewall parts 21A1 of the roller guide 21 and the lateral movement of the roller guide 21 in the respective directions is restrained as the respective sidewall parts 3Pc5 are contacted to the left and right edge stoppers 3F4b of the cushion pan part 3F4. As the cushion structure is interposed, the contact between the rigid roller guide 21 and the left and right edge stoppers 3F4b of the cushion pan part 3F4 is relieved, so that the lateral movement of the roller guide 21 is silently and smoothly stopped.

Figure 20:
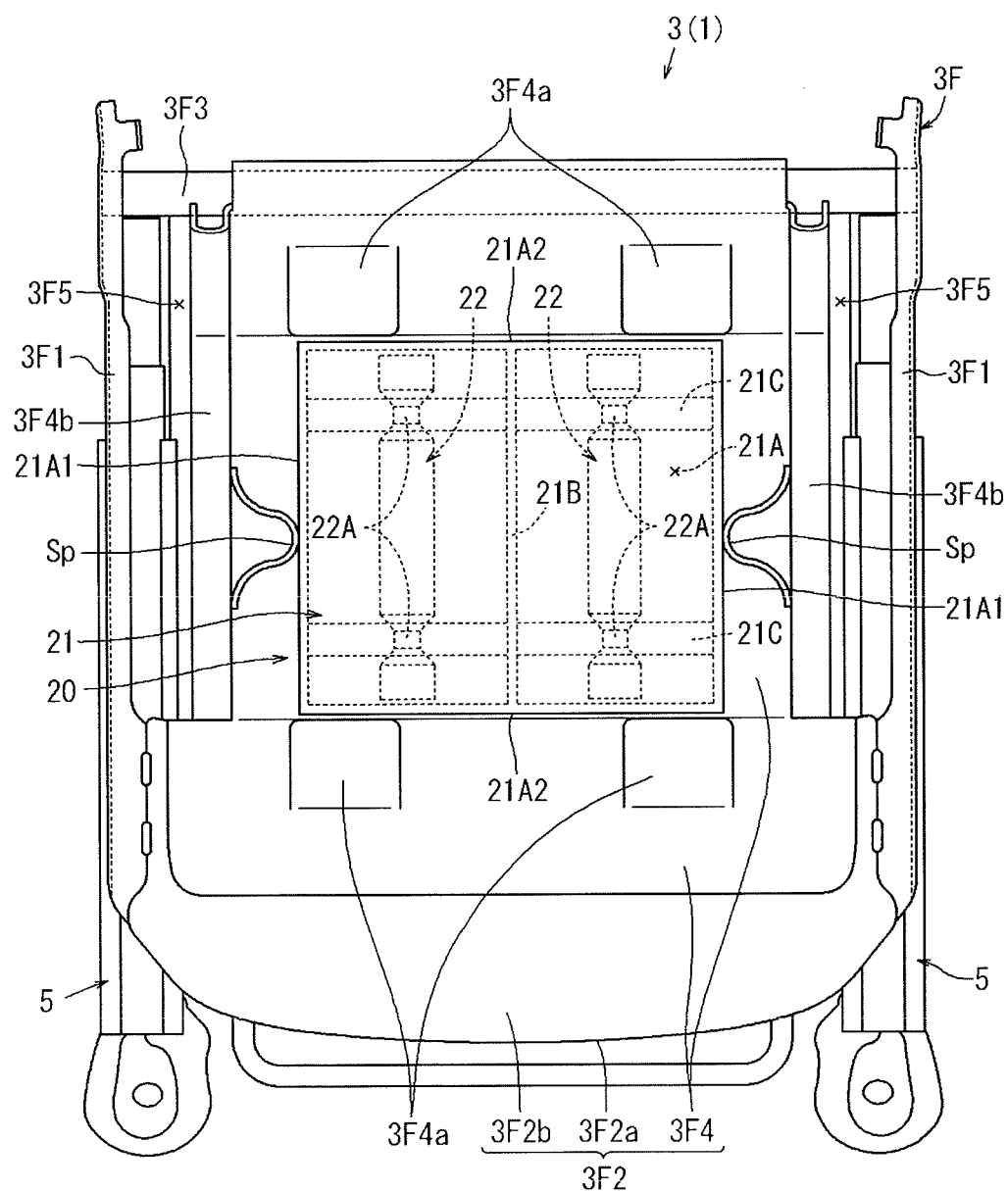
FIG. 20 is a plan view of a cushion frame showing a configuration of urging a support body to an original position by plate springs.

At the usual state, the support body 20 is positioned at the center portion in the seat width direction above the cushion pan part 3F4 by the tension of the cushion cover 3C which is tightly provided on the surface of the cushion pad 3P (described later). Thereby, at a state where the sitting passenger takes a usual sitting posture on the seat cushion 3, the load is applied on the support body 20 with good balance at the left and right sides, so that the sitting passenger can take a stable posture state. In the meantime, as shown in FIG. 20, plate springs Sp may be interposed between the left and right sides of the roller guide 21 and the left and right edge stoppers 3F4b of the cushion pan part 3F4, so that the support body 20 is positioned at the center portion in the seat width direction above the cushion pan part 3F4 at the usual state by urging forces of the plate springs Sp.

Figure 18:
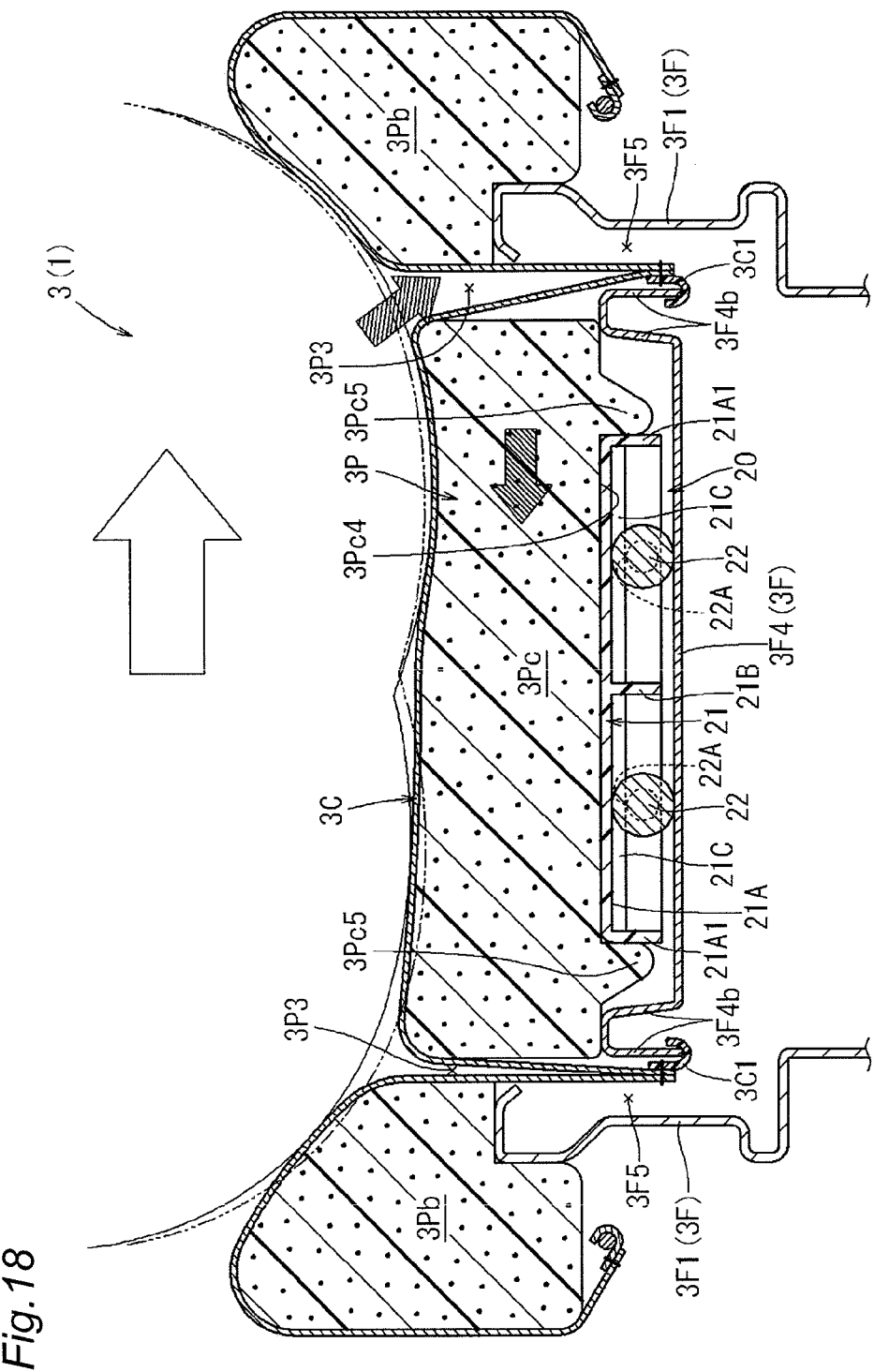
FIG. 18 is a sectional view showing a state where the passenger receives a lateral rightward load (the body weight is applied to the right)
Figure 19:
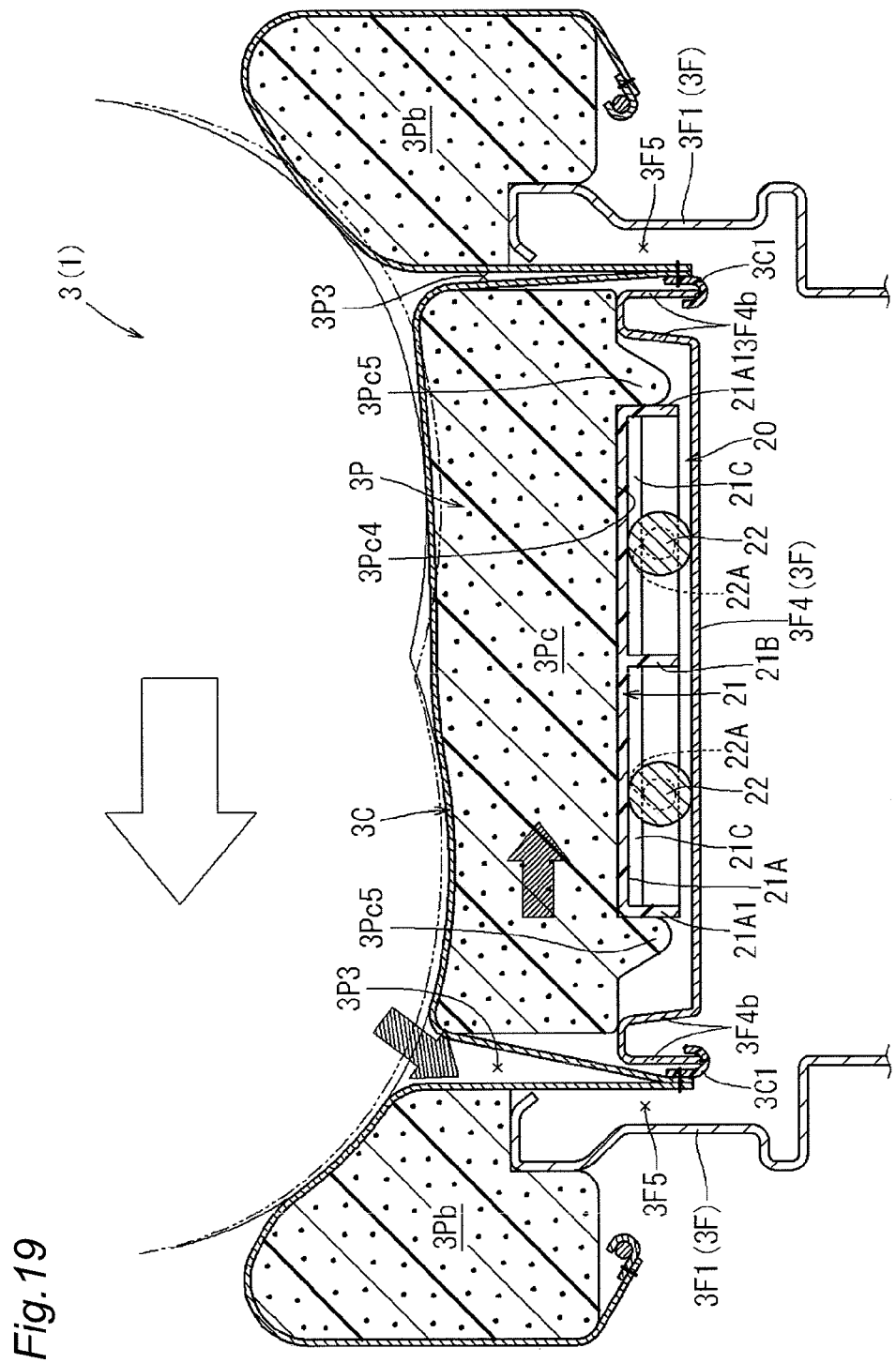
FIG. 19 is a sectional view showing a state where the passenger receives a lateral leftward load (the body weight is applied to the left)

However, as shown in FIGS. 16 and 17, when the passenger sitting on the seat cushion 3 moves its position on the seat cushion 3 so as to change the sitting posture, that is, for example, makes a posture change of raising one hip part to thus unevenly apply the load, the uneven load is applied to the right or left region part which is the support point of the posture change, so that the support body 20 is moved laterally. Specifically, when the uneven load is applied to the left or right region part of the center pad part 3Pc of the cushion pad 3P, the support body 20 is pressed and moved by the center pad part 3Pc of the cushion pad 3P, so that the support body is slid in the seat width direction. As the support body 20 is moved laterally, the uneven load applied to the center pad part 3Pc is relieved. Also, as shown in FIGS. 18 and 19, even when the passenger sitting on the seat cushion 3 receives a centrifugal force in the left or right direction as a traveling vehicle rounds a curve and thus makes a posture change of laterally swinging the pelvis about the lumbar, the uneven load is applied to the right or left region part, so that the support body 20 is slid.

Thereby, the retardation of the blood flow, which is caused when the body pressure of the sitting passenger is continuously applied to the same part of the seat cushion 3 for a long time, is solved, so that the blood flow is promoted. Therefore, after that, when the sitting passenger lowers the raised hip part and returns to a former posture state, the support body 20 is returned to the center position in the seat width direction, as shown in FIG. 15. As a result, the sitting passenger returns to the former sitting posture at a state where the retardation of the blood flow is solved, so that the sitting passenger can take a stable posture state where the passenger is supported evenly at left and right sides with good balance by the support body 20 from the lower.

Subsequently, the configuration of the cushion pad 3P is described with reference to FIG. 12. The cushion pad 3P is formed by foam molding a soft polyurethane foam raw material. The cushion pad 3P includes the front pad part 3Pa (an example of a fixed pat) which is mounted on the front panel 3F2 of the cushion frame 3F, the respective side pad parts 3Pb (an example of a fixed pat) which are mounted on the respective side frames 3F1, and the center pad part 3Pc (an example of a movable part) which is mounted on the support body 20.

The cushion pad 3P has a configuration where the front pad part 3Pa and the respective side pad parts 3Pb are integrally connected to each other, and the center pad part 3Pc is separately configured from the front pad part 3Pa and the respective side pad parts 3Pb. Thereby, the center pad part 3Pc can be individually bending-deformed or moved laterally, independently of the front pad part 3Pa and the respective side pad parts 3Pb.

As shown in FIG. 12, the rear part region 3Pc2 of the center pad part 3Pc of the cushion pad 3P, which supports the hip part of the sitting passenger, is configured such that a front surface there of is recessed into a bowl shape. Thereby, the center pad part 3Pc can favorably accommodate the hip part of the sitting passenger in the rear part region 3Pc2 supporting the hip part of the sitting passenger. Also, the front part region 3Pc1 of the center pad part 3Pc supporting the femoral regions of the sitting passenger is formed into an inclined shape where a front side thereof is raised to smoothly connect the rear part region 3Pc2 of the center pad part 3Pc and the front pad part 3Pa such that a front surface of the front part region 3Pc1 can support the front sides of the femoral regions of the sitting passenger to raise over the front pad part 3Pa set on the front panel 3F2 (refer to FIG. 14).

As shown in FIG. 15, each side pad part 3Pb is formed such that it is protrudes upwards more than the center pad part 3Pc. Accordingly, the respective side pad parts 3Pb can interpose and support the femoral regions of the sitting passenger from both outer sides thereof. Specifically, each side pad part 3Pb is formed such that it protrudes obliquely upwards from the edge part of a seat inner side adjacent to the center pad part 3Pc to the edge part of a seat outer side, and is configured such that it obliquely faces and supports the outer sides of the femoral regions of the sitting passenger.

As described above, the cushion pad 3P is mounted on the cushion frame 3F such that the front pad part 3Pa and the respective left and right side pad parts 3Pb are rigidly and stably supported from the lower side at the fixed positions by the front panel 3F2 and respective side frames 3F1 of the cushion frame 3F, and the center pad part 3Pc is supported from the lower side by the support body 20 such that the center pad part 3Pc can be moved to follow the movement of the support body 20.

Specifically, the cushion pad 3P is mounted at a state where the front pad part 3Pa and the respective left and right side pad parts 3Pb are set on the front panel 3F2 and respective side frames 3F1 of the cushion frame 3F and respectively cover the front panel 3F2 and respective side frames 3F1 from the upper side and peripheral side of the seat. After the cushion pad 3P is mounted on the cushion frame 3F, the cushion pad 3P is covered with the cushion cover 3C such that an entire surface (the sitting surface and front, rear, left and right sides) is covered, and the respective peripheral parts of the cushion cover 3C are tensioned and fixed to the bottom part of the cushion frame 3F. As a result, by the tension of the cushion cover 3C, the front pad part 3Pa and the respective side pad parts 3Pb are mounted with being strongly pressed and closely contacted to the front panel 3F2 and respective side frames 3F1 of the cushion frame 3F, and the center pad part 3Pc is also mounted with being strongly pressed and closely contacted on the support body 20.

According to this mounting, the cushion pad 3P is configured such that the center pad part 3Pc supporting the hip part of the sitting passenger is supported to laterally move by the support body 20, and the peripheral parts such as the front pad part 3Pa and the respective side pad parts 3Pb are strongly and stably supported at the fixed positions from the lower side by the front panel 3F2 and respective side frames 3F1 of the cushion frame 3F.

Here, the cushion cover 3C is fixed with being downwards tensioned and hung such that a part which covers a gap 3P4 between the center pad part 3Pc and the front pad part 3Pa of the cushion pad 3P, as shown in FIG. 14, and parts which cover gaps 3P3 between the center pad part 3Pc and the respective side pad parts 3Pb, as shown in FIG. 15, are not floated or wrinkled. Specifically, as shown in FIG. 14, the respective parts of the cushion cover 3C which cover portions between the center pad part 3Pc and the front pad part 3Pa of the cushion pad 3P, are individually downwards tensioned through the gap 3P4 between the center pad part 3Pc and the front pad part 3Pa and are integrally adhered and coupled to the bottom face part of the center pad part 3Pc and the bottom face part of the front pad part 3Pa.

Also, as shown in FIG. 15, the respective parts of the cushion cover 3C, which cover portions between the center pad part 3Pc and the respective side pad parts 3Pb, are downwards tensioned through the gaps 3P3 formed therebetween and are downwards tensioned through gaps 3F5 formed between the cushion pan part 3F4 and the respective side frames 3F1, so that the hooks 3C1 coupled to the seamed tips of the tensioned parts are respectively engaged to downwards-folded end portions of the respective edge stoppers 3F4b of the cushion pan part 3F4 and are thus fixed to the respective gaps 3P3 with being tensioned. Thereby, even when the support body 20 is slid from side to side, the cushion cover 3C relieves the sliding movement such that excessive forces are not applied between the center pad part 3Pc and the front pad part 3Pa and between the center pad part 3Pc and the respective side pad parts 3Pb, thereby stably maintaining the stretched states of the respective face parts covering the respective parts of the cushion pad 3P.

According to the above configuration, the cushion pad 3P can stably support the load of the sitting passenger at the fixed positions on the front pad part 3Pa and the respective side pad parts 3Pb which are supported at the fixed positions from the lower side by the front panel 3F2 and the respective side frames 3F1 of the cushion frame 3F. Therefore, since the passenger sitting on the driver seat is stably supported at the femoral regions by the front pad part 3Pa of the cushion pad 3P, which is not laterally moved, at the usual sitting posture, the passenger can take a comfortable sitting posture. Also, upon the driving operation of stepping on the accelerator pedal or the brake pedal, the femoral regions are stably supported, so that the passenger can perform the operation while maintaining the stable posture and can favorably perform the various driving operations. Also, when the sitting passenger raises one hip part to thus unevenly apply the load on the center pad part 3Pc, which is supported from the lower side by the support body 20 to be laterally moved, the cushion pad 3P laterally moves the support body 20 to follow the corresponding movement, thereby appropriately relieving the body pressure applied to the corresponding part. That is, the center pad part 3Pc of the cushion pad 3P supporting the hip part of the sitting passenger is moved laterally as the support body 20 is slid. Thereby, the sitting passenger can make a posture change of laterally moving the waist part by the movement of the support body 20. Hence, the retardation of the blood flow is favorably solved by the lateral movement of the waist part, so that the blood flow can be more favorably promoted.

That is, the seat 1 (the vehicle seat) of this illustrative embodiment is configured to have the cushion frame 3F (the seat frame) which supports the load of the sitting passenger, and the cushion pad 3P (the seat pad) which is set on the cushion frame 3F and receives the load of the sitting passenger to be relieved. Also, the support body 20 (the support body) which supports the center pad part 3Pc (a part) of the cushion pad 3P from the backside is provided to the cushion frame 3F. The support body 20 includes the two rollers 22 which are mounted to roll relative to the cushion frame 3F and is slid relative to the cushion frame 3F in the seat width direction (in an in-plane direction of a plane supporting the load of the sitting passenger) by the rolling of the two rollers 22, thereby relieving the load. The cushion pad 3P is configured to have the front pad part 3Pa (the fixed part) and the respective side pad parts 3Pb (the fixed part), which are supported at the fixed positions by the cushion frame 3F, and the center pad part 3Pc (the movable part), which is supported to be movable by the support body 20.

According to the above configuration, the load of the sitting passenger is stably received at the fixed positions of the front pad part 3Pa and respective side pad parts 3Pb of the cushion pad 3P through the support of the cushion frame 3F, and the load accompanied by the posture change of the sitting passenger is received to be relieved at the center pad part 3Pc of the cushion pad 3P through the support of the support body 20. Specifically, the center pad part 3Pc of the cushion pad 3P relieves the load as the support body 20 supporting the center pad part is slid in the seat width direction by the rolling of the respective rollers 22 which are mounted to roll relative to the cushion frame 3F. Therefore, it is possible to maintain the stable sitting quality at the front pad part 3Pa and respective side pad parts 3Pb of the cushion pad 3P and to appropriately relieve the body pressure at the center pad part 3Pc of the cushion pad 3P in conformity with the passenger movement of changing the posture.

Specifically, the cushion frame 3F is configured such that the cushion pan part 3F4 having a plane shape is bridged within the range of the cushion frame 3F forming an outline of the seat cushion 3. The support body 20 is configured by the recess-shaped roller guide 21, which is arranged in the recess portion 3Pc4 formed on the backside of the center pad part 3Pc of the cushion pad 3P such that the recess shape thereof overlaps with the recess portion 3Pc4, and the two rollers 22 which are provided in the recess shape of the roller guide 21 (in the recess portion 3Pc4) with being interposed between the roller guide and the cushion pan part 3F4. The support body 20 is guided to slide in the seat width direction relative to the cushion pan part 3F4 by the guide protrusions 3F4a formed on the cushion pan part 3F4.

That is, the roller guide 21 of the support body 20 is accommodated in the recess portion 3Pc4 formed on the backside of the center pad part 3Pc of the cushion pad 3P, and the rollers 22 are provided in the recess shape of the roller guide 21 (in the recess portion 3Pc4) with being interposed between the roller guide and the cushion pan part 3F4, so that it is possible to compactly interpose the support body 20 in the height direction between the center pad part 3Pc and the cushion pan part 3F4 without largely spacing the center pad part 3Pc of the cushion pad 3P from the cushion pan part 3F4. Also, the support body 20 is slidably guided by the guide protrusions 3F4a formed on the cushion pan part 3F4, so that the support body 20 is stably slid in the seat width direction. Thus, it is possible to appropriately relieve the load accompanied by the posture change of the sitting passenger. Also, the rollers 22 are adopted as the rolling body, so that it is possible to widen a contact area with the cushion pan part 3F4, compared to a configuration where a sphere body is adopted. Thereby, the load is easily dispersed, so that a pressing mark is less likely to be formed and it is thus possible to favorably make the sliding ability or durability of the roller guide 21.

Also, at the usual state, the support body 20 is positioned at the center portion in the seat width direction above the cushion pan part 3F4 by the tension of the cushion cover 3C. Thus, when the support body 20 is slid in the seat width direction, it relieves the load of the sitting passenger. According to this configuration, at a state where the sitting passenger applies the load to the seat cushion 3 at the usual sitting posture, the load is evenly applied to the support body 20 at the left and right sides, which is positioned at the center portion in the seat width direction. Hence, since the sitting posture of the sitting passenger is more stable at the usual state, the sitting quality can be further improved.

Also, the center pad part 3Pc (the movable part) of the cushion pad 3P and the front pad part 3Pa and respective side pad parts 3Pb (the fixed part) are separately configured. According to this configuration, since the front pad part 3Pa and respective side pad parts 3Pb of the cushion pad 3P and the center pad part 3Pc do not follow the mutual movement, it is possible to more easily stabilize the front pad part 3Pa and the respective side pad parts 3Pb and to enable the center pad part 3Pc to more easily follow the movement of the support body 20. Therefore, the passenger can easily change the sitting posture while maintaining the more stable sitting quality and the body pressure can be appropriately relieved in conformity with the passenger movement.

Third Illustrative Embodiment

Figure 21:
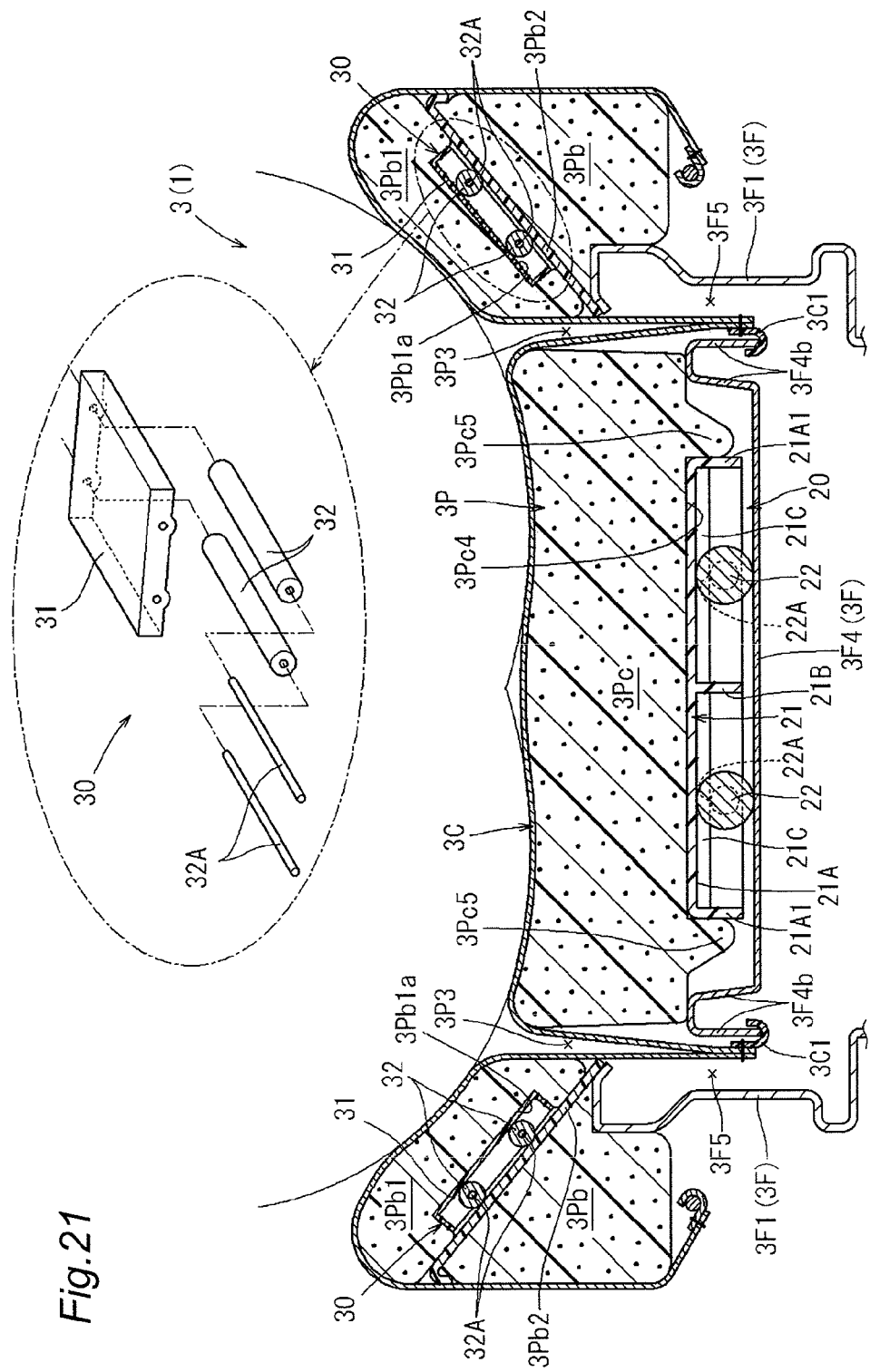
FIG. 21 is a sectional view showing a partial configuration of a vehicle seat according to a third illustrative embodiment.

In the below, a configuration of the seat 1 of a third illustrative embodiment is described with reference to FIGS. 21 to 23. As shown in FIG. 21, the seat 1 of this illustrative embodiment has a configuration where the seat 1 of the second illustrative embodiment is further provided with side support bodies 30 enabling both left and right side pad parts 3Pb of the seat cushion 3 to laterally move to follow the passenger movement of laterally changing the sitting posture.

Specifically, the respective side pad parts 3Pb, although the entire figure thereof is not shown, have a configuration where upper shape parts 3Pb1 of a rear area positioned at left and right sides of the center pad part 3Pc are separated such that they can be moved laterally independently of the respective side pad parts 3Pb. The side support body 30, which obliquely slides and guides the upper shape part 3Pb1 such that an outer side of the upper shape part is raised in the seat width direction, is provided between the upper shape part 3Pb1 and the lower shape part (the respective side pad parts 3Pb).

Each side support body 30 is configured by a box-shaped slide guide 31 which is opened downwards and two cylindrical rollers 32 which are rotatably axis-connected in the box of the slide guide 31. The slide guide 31 is accommodated in a recess portion 3Pb1a formed on a bottom face part of the upper shape part 3Pb1 such that the recess shapes overlap with each other, and is integrally connected to the recess portion. The respective rollers 32 are mounted at positions spaced in the seat width direction at a state where an axis direction thereof is faced towards the seat front-rear direction and a part thereof is accommodated in the box of the slide guide 31. The respective rollers 32 are pivoted with being axis-rotatable relative to the slide guide 31 by axis pins 32A inserted therein.

Each side support body 30 is set on a resin plate 3Pb2, which is stacked on an upper face part of the lower shape part (the side pad part 3Pb) positioned below the upper shape part 3Pb1, and is provided to slide on the resin plate 3Pb2 in the seat width direction as the rollers 32 are rolled. The resin plate 3Pb2 has a shape such that an outer side is raised in the seat width direction. At the usual state, each side support body 30 is located at a center position configuring an original shape of the side pad part 3Pb at the usual state by the tension of the cushion cover 3C which is tightly provided on the surface of the side pad part 3Pb.

Figure 22:
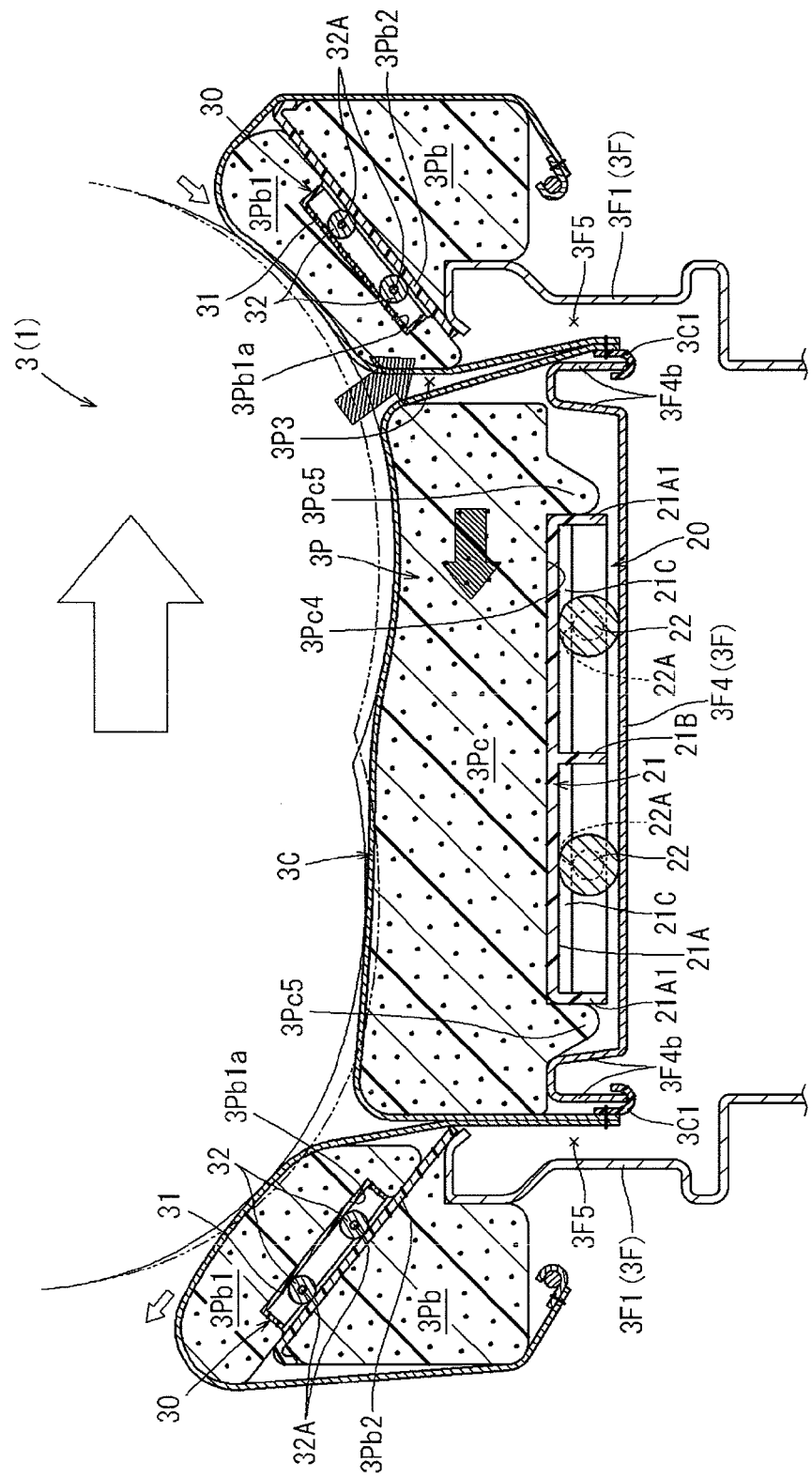
FIG. 22 is a sectional view showing a state where the passenger receives a lateral rightward load (the body weight is applied to the right)
Figure 23:
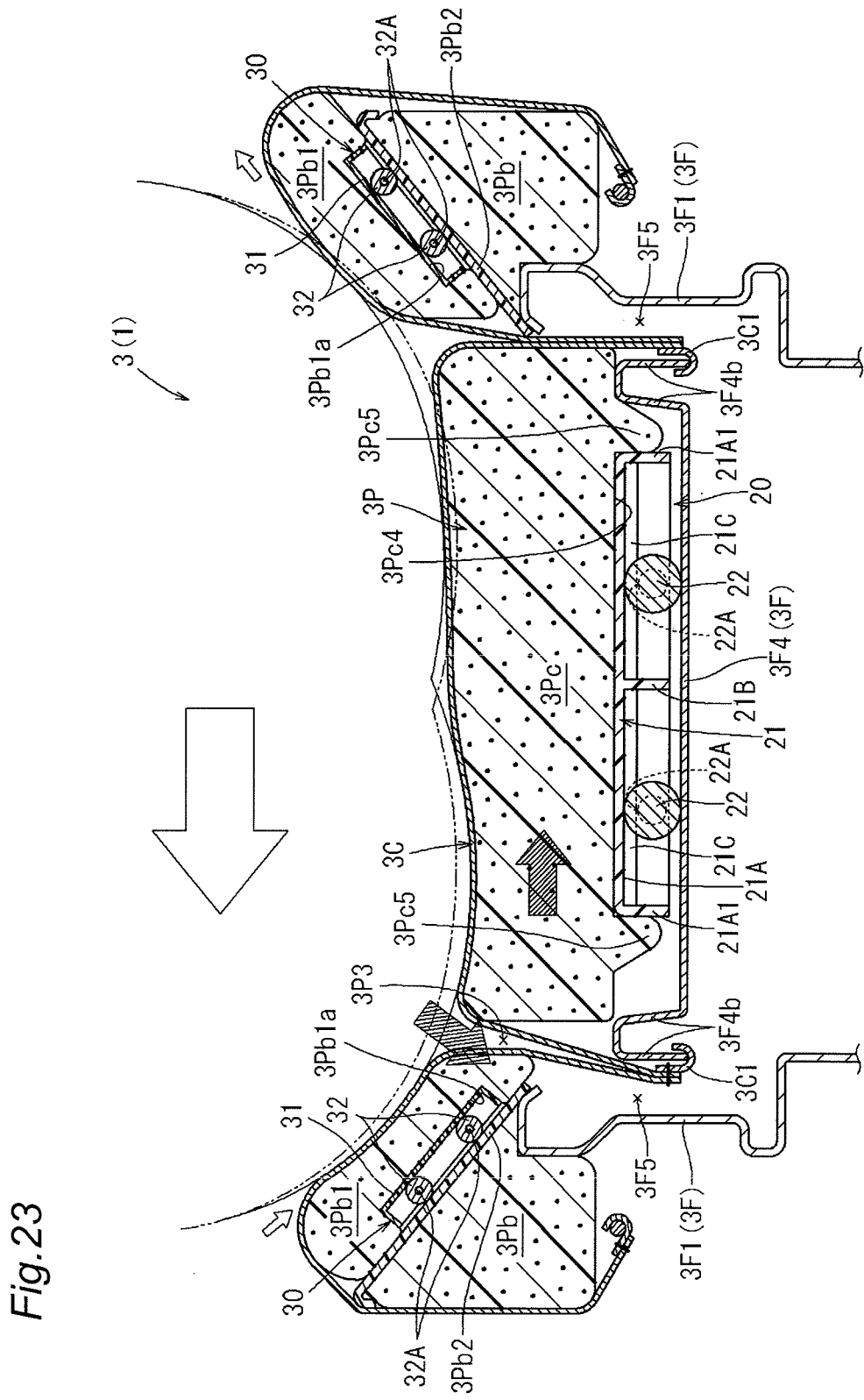
FIG. 23 is a sectional view showing a state where the passenger receives a lateral leftward load (the body weight is applied to the left).

However, as shown in FIGS. 22 and 23, when the passenger sitting on the seat cushion 3 receives a centrifugal force in the left or right direction as a traveling vehicle rounds a curve and thus makes a posture change of laterally swinging the pelvis about the lumbar from side to side, the respective side support bodies 30 are applied with the load from the hip part of the sitting passenger, which is input to the upper shape parts 3Pb1 of the respective side pad parts 3Pb as the support body 20 is laterally moved due to the passenger movement, and are thus slid on the respective resin plates 3Pb2 in the seat width direction (in an ascending direction of the seat outer side or in a descending direction of the seat inner side). Therefore, the side support bodies 30 are slid together with the support body 20, so that the uneven load applied to the center pad part 3Pc can be more favorably relieved. Hence, the passenger can easily change the sitting posture while maintaining the more stable sitting quality and the body pressure can be appropriately relieved in conformity with the passenger movement.

Also, even when the passenger sitting on the seat cushion 3 moves its position on the seat cushion 3 so as to change the sitting posture, for example, makes a posture change of raising one hip part to thus unevenly apply the load, the respective side support bodies 30 are applied with the load from the hip part of the sitting passenger, which is input to the upper shape parts 3Pb1 of the respective side pad parts 3Pb, like the above case, and are thus slid on the respective resin plates 3Pb2 in the seat width direction (in an ascending direction of the seat outer side or in a descending direction of the seat inner side). Therefore, the side support bodies 30 are slid together with the support body 20, so that the uneven load applied to the center pad part 3Pc can be more favorably relieved. Hence, the passenger can easily change the sitting posture while maintaining the more stable sitting quality, and the body pressure can be appropriately relieved in conformity with the passenger movement.

Specifically, since the respective side support bodies 30 are formed to slide in an inclined direction along which the outer sides thereof are raised in the seat width direction, the side support bodies are moved to surround the vicinity of the lumbar together with the support body 20, which is provided at the center portion in the seat width direction, while forming a rotating movement trajectory about the vicinity of the lumbar of the sitting passenger. Thereby, the respective side pad parts 3Pb supported by the respective side support bodies 30 and the center pad part 3Pc supported by the center support body 20 are easily moved to follow the sitting passenger movement of the posture change of laterally swinging the pelvis from side to side or raising the one hip part. Hence, the passenger can easily change the sitting posture and the body pressure can be appropriately relieved in conformity with the passenger movement.

Although the three illustrative embodiments have been described, the present invention can be further implemented in various manner, in addition to the above illustrative embodiments. For example, the vehicle seat of the present invention may be applied to a seat other than the driver seat of the vehicle, a seat of a vehicle such as a train, other than the automobile and a seat of various vehicles such as airplane, a ship and the like.

Also, the configuration of the present invention may be applied to a seat back of the vehicle seat. Specifically, the support body may be provided to support a part of a pad of the seat back, which supports a waist or back of a sitting passenger, and the support body may be provided to be slidable in an in-plane direction of a plane supporting the load of the sitting passenger or to be axially rotatable in an out-of-plane direction of the plane. According to this configuration, when a passenger leaning on the seat back makes a posture change of raising the left or right waist or back to thus apply uneven load, such as a change of the leaning posture, the uneven load is applied to the right or left region part which is the support point of the posture change, so that the support body is moved to appropriately relieve the body pressure of the sitting passenger.

Also, the support body may be configured to slide in the front-rear direction of the seat cushion (in an in-plane direction of a plane supporting the sitting load) or in a height direction of the seat back (in an in-plane direction of a plane supporting the sitting load). Also, the support body may be configured in the seat cushion such that a front end of the center portion in the seat width direction is elastically hung to the cushion frame by a plurality of springs and is supported in a tilt direction and a rear end is rotatably axis-supported to the cushion frame.

Also, in the above respective illustrative embodiments, regarding the seat cushion (the cushion pad) of the present invention, the peripheral part (the front pad part and the respective side pad parts) is the fixed part which is supported at the fixed position by the seat frame and the center part (the center pad part) is the movable part which is supported to be movable by the support body. However, the center part may be the fixed part and the peripheral part may be the movable part. Also, the movable part and the fixed part may be allotted by partitioning the pad of the seat cushion in the front-rear direction or partitioning the pad of the seat back in the upper-lower direction. According to this partitioning, the movement of the movable part in the seat width direction is difficult to be restrained, so that the movable part is smoothly slid in the seat width direction. In the meantime, the movable part and the fixed part may be connected to each other, like the first illustrative embodiment, or may be separated from each other, like the second illustrative embodiment. As in the first illustrative embodiment, regarding the configuration where the movable part and the fixed part of the seat pad are connected to each other, the slit which is formed at the boundary part between the movable part and the fixed part so as to easily follow the movement of the support body may be partially formed on the front surface or backside therebetween or may be formed over an entire area in a thickness direction.

In the first illustrative embodiment, the support body is configured by assembling the wires in a ladder shape. Instead of this configuration, a sheet-shaped member where a fabric material is tightly provided in the frame may be adopted. Also, the roller of the second illustrative embodiment, which supports the support body to slide relative to the cushion frame, may be one or three or more. Even when one roller is provided, the peripheral part of the roller guide is rest on the cushion pan part while rattling a little, so that the support body is slid by the one roller. Also, when three or more rollers are provided, a contact area with the cushion pan part is further widened, so that the load is dispersed more easily. Therefore, a pressing mark is not likely to be formed and it is thus possible to favorably make the sliding ability or durability of the roller guide 21.

Also, each roller of the second illustrative embodiment may be formed to have a (truncated) conical shape and the moving trajectory of the support body may be bent into an arc shape. According to this configuration, the support body is slid in the seat width direction about the front-side part thereof, like a pendulum. Also, the cushion pan part which supports the respective rollers may be formed into a V shape such that it descends towards the center portion in the seat width direction or the entirety thereof may be bent, so that the support body is slid in a rightward ascending shape or in a leftward descending shape as the respective rollers roll.

Also, the configuration of the third illustrative embodiment where the respective side pad parts of the cushion pad are slid from side to side by the respective side support bodies may be combined with the configuration of the first illustrative embodiment where the support body is tilted. Also, the respective side support bodies may be provided such that the respective side pad parts are horizontally slid in the seat width direction. Also, at the usual state, the respective side support bodies may be urged and maintained at the original positions by urging forces of springs which are separately provided, not the tension of the seat cover. Also, each side support body may be configured by providing a rolling base such as a resin plate on the bottom face part of the movable part and providing a rolling body such as a roller, which can laterally move the rolling base, to the fixed part. Also, the roller may be formed to have a (truncated) conical shape and the moving trajectory of each side support body may be bent into an arc shape. According to this configuration, each support body can be slid in the seat width direction about the front part thereof, like a pendulum. Also, the resin plate that supports the rollers of the side support body may be bent into an arc shape about the vicinity of the lumbar, so that the side support body is moved to pass through a moving trajectory closer to the rotating moving trajectory about the vicinity of the lumbar.

What is claimed is:
1. A vehicle seat comprising a quadrangle shaped seat frame configured to support a load of a sitting passenger;
a seat pad which is set on the seat frame and receives the load of the sitting passenger; and
a support body which is supported on the seat frame and supports a part of the seat pad from a backside thereof, the quadrangle shaped seat frame including a pair of side frames, a front panel bridging front ends of the side frames, and a rear pipe bridging rear ends of the side frames, the side frames, front panel, and rear pipe generally defining a plane, wherein the support body is supported to be slidable on the seat frame in an in-plane direction of the plane and supporting the load of the sitting passenger or is rotatably supported on the front panel for rotation about an axis that intersects the plane at an acute angle and is rotatable in an out-of-plane direction of the plane, and the support body is elastically hung on the rear pipe of the seat frame by a plurality of springs, such that the load of the sitting passenger can be relieved, and wherein the seat pad includes a fixed part which is supported on at least one of the front panel and the side frames of the seat frame at a fixed position and a movable part which is supported on the support body.

2. The vehicle seat according to claim 1, wherein the support body is configured such that a center portion of the support body in a width direction is rotatably axis-supported on the seat frame and side surface parts are tilted to follow a movement of the load of the sitting passenger, which is applied unevenly between the side surface parts.

3. The vehicle seat according to claim 2, wherein one end of the center portion of the support body is rotatably axis-supported on the seat frame, and another end of the center portion of the support body is elastically hung on the seat frame by a plurality of springs, such that the support body is supported in a tilt direction.

4. The vehicle seat according to claim 3, wherein the support body is provided within the seat frame and configuring a skeleton of a seat cushion, and wherein the end of the center portion of the support body is rotatably axis-supported on the cushion frame is a front end of the center portion of the support body, and the end of the center portion of the support body elastically hung on the cushion frame by the plurality of springs is a rear end of the center portion of the support body, such that the support body is supported in the tilt direction.

5. The vehicle seat according to claim 1, wherein the seat pad is formed with a slit at a boundary part of the movable part and the fixed part to allow the movable part to follow movement of the support body.

* * * * *